(12) United States Patent
Fukumori et al.

(10) Patent No.: US 10,480,617 B2
(45) Date of Patent: Nov. 19, 2019

(54) BICYCLE CHAIN

(71) Applicant: SHIMANO INC., Sakai (JP)

(72) Inventors: Tsuyoshi Fukumori, Sakai (JP); Atsuhiro Emura, Sakai (JP)

(73) Assignee: SHIMANO INC., Sakai (JP)

( * ) Notice: Subject to any disclaimer, the term of this patent is extended or adjusted under 35 U.S.C. 154(b) by 296 days.

(21) Appl. No.: 15/672,232

(22) Filed: Aug. 8, 2017

(65) Prior Publication Data
US 2019/0048973 A1 Feb. 14, 2019

(51) Int. Cl.
| | | |
|---|---|---|
| *F16G 13/06* | (2006.01) | |
| *F16G 13/02* | (2006.01) | |
| *B62M 9/06* | (2006.01) | |
| *F16H 55/30* | (2006.01) | |
| *B62M 9/00* | (2006.01) | |
| *F16G 13/18* | (2006.01) | |
| *B62M 1/00* | (2010.01) | |

(52) U.S. Cl.
CPC .............. *F16G 13/02* (2013.01); *B62M 9/00* (2013.01); *B62M 9/06* (2013.01); *F16G 13/06* (2013.01); *F16G 13/18* (2013.01); *F16H 55/30* (2013.01); *B62M 1/00* (2013.01); *B62M 2009/005* (2013.01)

(58) Field of Classification Search
CPC .......... F16G 13/02; F16G 13/06; F16G 13/18; F16H 55/30; B62M 9/00; B62M 9/005; B62M 1/00; B62M 9/12; B62M 9/06
USPC ........................................................... 59/29
See application file for complete search history.

(56) References Cited

U.S. PATENT DOCUMENTS

| | | | |
|---|---|---|---|
| 7,325,391 B1 | 2/2008 | Oishi et al. | |
| 7,914,410 B2 | 3/2011 | Oishi et al. | |
| 2012/0322599 A1* | 12/2012 | Oishi | F16G 13/06 474/230 |
| 2015/0094180 A1* | 4/2015 | Fukumori | B62M 9/00 474/206 |
| 2015/0094181 A1* | 4/2015 | Fukumori | B62M 9/00 474/206 |
| 2015/0094182 A1* | 4/2015 | Fukumori | F16G 13/06 474/206 |
| 2015/0292597 A1* | 10/2015 | Fukumori | F16G 15/12 474/226 |

(Continued)

FOREIGN PATENT DOCUMENTS

JP    11-270633    10/1999

*Primary Examiner* — David B Jones
(74) *Attorney, Agent, or Firm* — Mori & Ward, LLP

(57) ABSTRACT

A bicycle chain comprises a first outer link plate. The first outer link plate comprises a first outer-link end portion, a second outer-link end portion, a first outer-link intermediate portion, and a first outer-link longitudinal centerline. The first outer-link end portion, the second outer-link end portion and the first outer-link intermediate portion define a first outer-link outer peripheral edge. The first outer-link outer peripheral edge comprises a first outer-link end edge, a second outer-link end edge, and a pair of first outer-link intermediate edges. A first radial distance is defined from a first outer-link center axis to the first outer-link end edge in a perpendicular direction. A minimum distance is defined between the pair of first outer-link intermediate edges in the perpendicular direction. The minimum distance is smaller than 200% of the first radial distance and is equal to or larger than 5 mm.

17 Claims, 33 Drawing Sheets

(56) References Cited

U.S. PATENT DOCUMENTS

| | | | |
|---|---|---|---|
| 2015/0308542 A1* | 10/2015 | Fukumori | B62M 9/00 |
| | | | 474/230 |
| 2017/0067535 A1* | 3/2017 | Fukumori | F16G 13/06 |
| 2017/0307049 A1* | 10/2017 | Fukumori | F16G 13/06 |
| 2018/0017131 A1* | 1/2018 | Fukumori | F16G 13/06 |
| 2019/0048974 A1* | 2/2019 | Fukumori | F16G 13/06 |
| 2019/0100278 A1* | 4/2019 | Fukumori | B62M 9/12 |
| 2019/0101188 A1* | 4/2019 | Akanishi | F16G 13/06 |

* cited by examiner

BICYCLE CHAIN

BACKGROUND OF THE INVENTION

Field of the Invention

The present invention relates to a bicycle chain.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a chain.

SUMMARY OF THE INVENTION

In accordance with a first aspect of the present invention, a bicycle chain comprises a first outer link plate. The first outer link plate comprises a first outer-link end portion, a second outer-link end portion, a first outer-link intermediate portion and a first outer-link longitudinal centerline. The first outer-link end portion includes a first outer-link circular opening having a first outer-link center axis. The second outer-link end portion includes a second outer-link circular opening having a second outer-link center axis parallel to the first outer-link center axis. The second outer-link center axis is spaced apart from the first outer-link center axis in a first outer-link longitudinal direction. The first outer-link intermediate portion interconnects the first outer-link end portion and the second outer-link end portion. The first outer-link end portion, the second outer-link end portion and the first outer-link intermediate portion define a first outer-link outer peripheral edge. The first outer-link outer peripheral edge comprises a first outer-link end edge, a second outer-link end edge, and a pair of first outer-link intermediate edges. The first outer-link end edge extends about the first outer-link end portion. The second outer-link end edge extends about the second outer-link end portion. The pair of first outer-link intermediate edges extends along the first outer-link intermediate portion between the first outer-link end edge and the second outer-link end edge. The first outer-link longitudinal centerline is perpendicular to the first outer-link center axis and the second outer-link center axis. A first radial distance is defined from the first outer-link center axis to the first outer-link end edge in a perpendicular direction perpendicular to the first outer-link longitudinal centerline when viewed in an axial direction parallel to the first outer-link center axis. A minimum distance is defined between the pair of first outer-link intermediate edges in the perpendicular direction. The minimum distance is smaller than 200% of the first radial distance. The minimum distance is equal to or larger than 5 mm.

With the bicycle chain according to the first aspect, the minimum distance of the first outer link plate improves chain-holding performance. Furthermore, the minimum distance of the first outer link plate maintains strength of the first outer link plate even when a thickness of the first outer link plate reduces in association with increase in a total number of sprocket wheels of a sprocket.

In accordance with a second aspect of the present invention, the bicycle chain according to the first aspect is configured so that the minimum distance is equal to or smaller than 8 mm.

With the bicycle chain according to the second aspect, it is possible to further improve chain-holding performance and further maintain strength of the first outer link plate even when the thickness of the first outer link plate reduces in association with increase in a total number of sprocket wheels of the sprocket.

In accordance with a third aspect of the present invention, the bicycle chain according to the first or second aspect is configured so that the minimum distance is equal to or larger than 121% of the first radial distance.

With the bicycle chain according to the third aspect, it is possible to further improve chain-holding performance and further maintain strength of the first outer link plate even when the thickness of the first outer link plate reduces in association with increase in a total number of sprocket wheels of the sprocket.

In accordance with a fourth aspect of the present invention, the bicycle chain according to the first aspect is configured so that the minimum distance is equal to or smaller than 190% of the first radial distance.

With the bicycle chain according to the fourth aspect, it is possible to further improve chain-holding performance and further maintain strength of the first outer link plate even when the thickness of the first outer link plate reduces in association with increase in a total number of sprocket wheels of the sprocket.

In accordance with a fifth aspect of the present invention, the bicycle chain according to any one of the first to fourth aspects is configured so that at least one of the pair of first outer-link intermediate edges has a curvature radius equal to or larger than 8.2 mm.

With the bicycle chain according to the fifth aspect, it is possible to further improve chain-holding performance and further maintain strength of the first outer link plate even when the thickness of the first outer link plate reduces in association with increase in a total number of sprocket wheels of the sprocket.

In accordance with a sixth aspect of the present invention, the bicycle chain according to the fifth aspect is configured so that the curvature radius is equal to or smaller than 12 mm.

With the bicycle chain according to the sixth aspect, it is possible to further improve chain-holding performance and further maintain strength of the first outer link plate even when the thickness of the first outer link plate reduces in association with increase in a total number of sprocket wheels of the sprocket.

In accordance with a seventh aspect of the present invention, the bicycle chain according to the fifth or sixth aspect is configured so that the first outer-link end edge includes at least one first outer-link straight edge portion and at least one first outer-link curved edge portion. The second outer-link end edge includes at least one second outer-link straight edge portion and at least one second outer-link curved edge portion. The at least one first outer-link straight edge portion and the at least one second outer-link straight edge portion are tangent to a virtual circle having a radius equal to the curvature radius of the at least one of the pair of first outer-link intermediate edges when viewed in the axial direction.

With the bicycle chain according to the seventh aspect, it is possible to further improve chain-holding performance and further maintain strength of the first outer link plate even when the thickness of the first outer link plate reduces in association with increase in a total number of sprocket wheels of the sprocket.

In accordance with an eighth aspect of the present invention, the bicycle chain according to the seventh aspect is configured so that the first outer-link longitudinal centerline bisects the first outer-link plate into a first side and a second side opposite to the first side with respect to the first outer-link longitudinal centerline. The at least one first outer-link straight edge portion of the first side and the at least one second outer-link straight edge portion of the first side are tangent to the virtual circle having the radius equal to the curvature radius of the at least one of the pair of first outer-link intermediate edges of the first side when viewed in the axial direction.

With the bicycle chain according to the eighth aspect, it is possible to further improve chain-holding performance and further maintain strength of the first outer link plate even when the thickness of the first outer link plate reduces in association with increase in a total number of sprocket wheels of the sprocket.

In accordance with a ninth aspect of the present invention, a bicycle chain comprises a first outer link plate. The first outer link plate comprises a first outer-link end portion, a second outer-link end portion, a first outer-link intermediate portion, and a first outer-link longitudinal centerline. The first outer-link end portion includes a first outer-link opening having a first outer-link center axis. The second outer-link end portion includes a second outer-link opening having a second outer-link center axis parallel to the first outer-link center axis. The second outer-link center axis is spaced apart from the first outer-link center axis in a first outer-link longitudinal direction. The first outer-link intermediate portion interconnects the first outer-link end portion and the second outer-link end portion. The first outer-link longitudinal centerline is perpendicular to the first outer-link center axis and the second outer-link center axis. The first radial distance is defined from the first outer-link center axis to the first outer-link end edge in a perpendicular direction perpendicular to the first outer-link longitudinal centerline when viewed in an axial direction parallel to the first outer-link center axis. The first outer-link intermediate portion has a recess. A second radial distance is defined between the first outer-link center axis and a boundary of the recess when viewed in an axial direction parallel to the first outer-link center axis. The second radial distance is larger than the first radial distance.

With the bicycle chain according to the ninth aspect, it is possible to improve strength of the first outer link plate.

In accordance with a tenth aspect of the present invention, the bicycle chain according to the ninth aspect is configured so that the second radial distance is larger than 4.2 mm.

With the bicycle chain according to the tenth aspect, it is possible to further improve strength of the first outer link plate.

In accordance with an eleventh aspect of the present invention, the bicycle chain according to the ninth or tenth aspect is configured so that the second radial distance is equal to or smaller than 4.75 mm.

With the bicycle chain according to the eleventh aspect, it is possible to further improve strength of the first outer link plate.

In accordance with a twelfth aspect of the present invention, the bicycle chain according to any one of the first to eleventh aspects is configured so that at least one of the first outer-link end edge, the second outer-link end edge, and the pair of first outer-link intermediate edges has a chamfer.

With the bicycle chain according to the twelfth aspect, it is possible to make a shifting operation of the bicycle chain smooth.

In accordance with a thirteenth aspect of the present invention, a bicycle chain comprises a first outer link plate. The first outer link plate comprises a first outer-link end portion, a second outer-link end portion, and a first outer-link intermediate portion. The first outer-link end portion includes a first outer-link opening having a first outer-link center axis. The second outer-link end portion includes a second outer-link opening having a second outer-link center axis parallel to the first outer-link center axis. The second outer-link center axis is spaced apart from the first outer-link center axis in a first outer-link longitudinal direction. The first outer-link intermediate portion interconnects the first outer-link end portion and the second outer-link end portion. The first outer-link end portion, the second outer-link end portion and the first outer-link intermediate portion define a first outer-link outer peripheral edge. The first outer-link outer peripheral edge comprises a first outer-link end edge, a second outer-link end edge, and a pair of first outer-link intermediate edges. The first outer-link end edge extends about the first outer-link end portion. The second outer-link end edge extends about the second outer-link end portion. The pair of first outer-link intermediate edges extends along the first outer-link intermediate portion between the first outer-link end edge and the second outer-link end edge. The first outer-link end edge has a first chamfer extending about the first outer-link center axis such that a part of the first chamfer disposed in a circumferential area defined from a first outer-link longitudinal centerline perpendicular to the first outer-link center axis and the second outer-link center axis to a first reference line extending radially outwardly from first outer-link center axis when viewed in an axial direction of the first outer-link center axis, the circumferential area being smaller than 90 degrees.

With the bicycle chain according to the thirteenth aspect, it is possible to make a shifting operation of the bicycle chain smooth.

In accordance with a fourteenth aspect of the present invention, the bicycle chain according to the thirteenth aspect is configured so that the circumferential area is equal to or smaller than 45 degrees.

With the bicycle chain according to the fourteenth aspect, it is possible to make a shifting operation of the bicycle chain smoother.

In accordance with a fifteenth aspect of the present invention, the bicycle chain according to the thirteenth or fourteenth aspect is configured so that the circumferential area is larger than 0 degrees.

With the bicycle chain according to the fifteenth aspect, it is possible to make a shifting operation of the bicycle chain smoother.

In accordance with a sixteenth aspect of the present invention, the bicycle chain according to any one of the first to fifteenth aspects is configured so that a maximum axial width of the first outer link plate is equal to or smaller than 1 mm.

With the bicycle chain according to the sixteenth aspect, it is possible to apply the bicycle chain to a sprocket having a larger total number of sprocket wheels.

In accordance with a seventeenth aspect of the present invention, the bicycle chain according to the sixteenth aspect is configured so that the maximum axial width of the first outer link plate is equal to or larger than 0.7 mm.

With the bicycle chain according to the seventeenth aspect, it is possible to certainly apply the bicycle chain to a sprocket having a larger total number of sprocket wheels.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
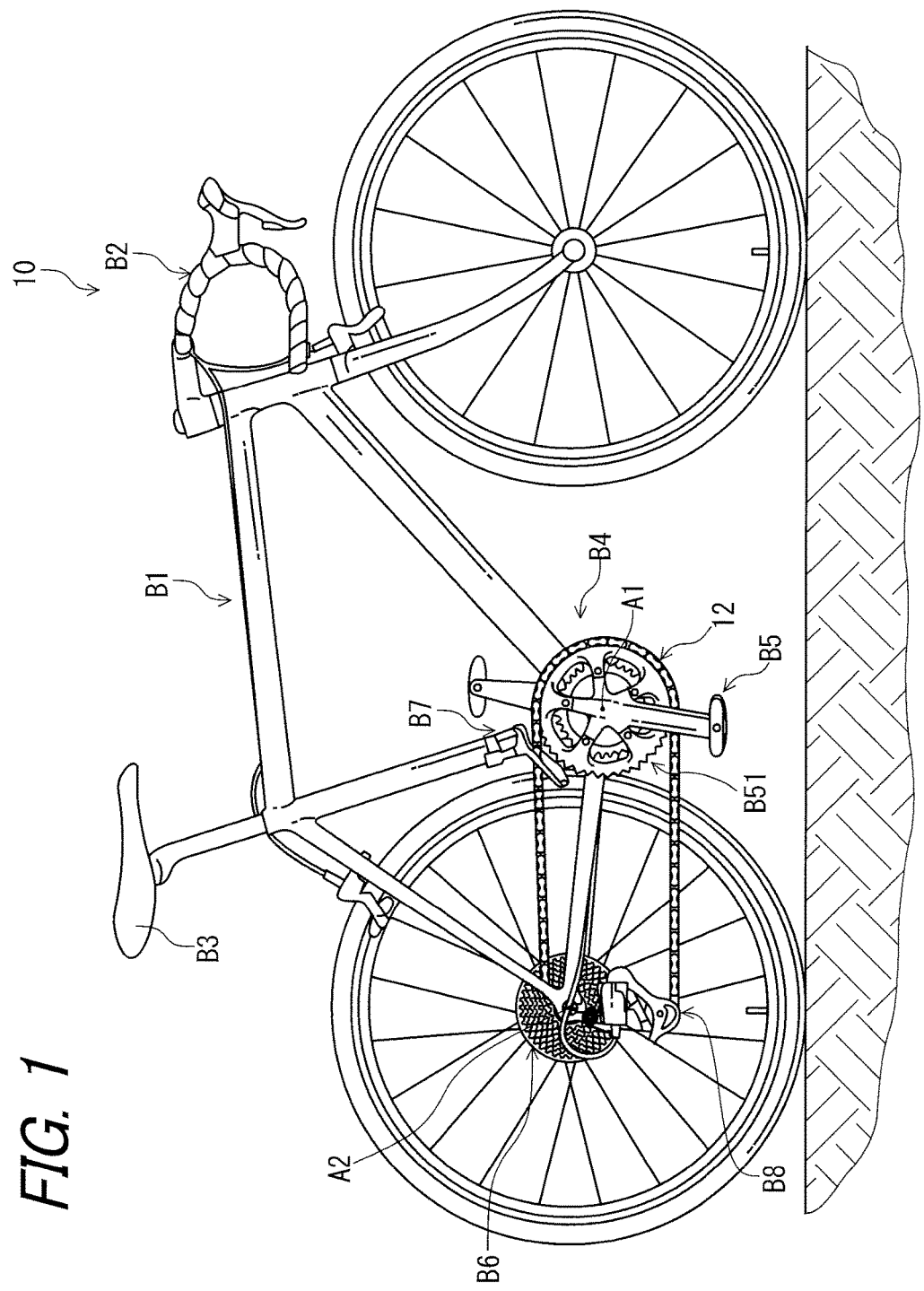
FIG. 1 is a side elevational view of a bicycle having a drive train that uses a bicycle chain in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle 10 is illustrated to be equipped with a bicycle chain 12 in accordance with a first embodiment. The bicycle 10 includes a bicycle frame B1, a handlebar B2, a saddle B3, and a drive train B4. The drive train B4 is configured to convert the rider's pedaling force into driving force. The bicycle chain 12 is a part of the drive train B4. The drive train B4 also includes a bicycle crank assembly B5, a rear sprocket B6, a front derailleur B7, and a rear derailleur B8. The bicycle crank assembly B5 includes a front sprocket B51. The bicycle crank assembly B5 is rotatably mounted on a bottom bracket of the bicycle frame B1 about a rotational center axis A1. The rear sprocket B6 is rotatably mounted to the bicycle frame B1 about a rotational center axis A2. The bicycle chain 12 is arranged on the front sprocket B51 and the rear sprocket B6 so as to extend therebetween. The front derailleur B7 and the rear derailleur B8 are configured and arranged to change gears by shifting the bicycle chain 12 in a transverse direction of the bicycle 10. The front sprocket B51 can also be referred to as a bicycle sprocket B51. The rear sprocket B6 can also be referred to as a bicycle sprocket B6.

In the present application, the following directional terms "front," "rear," "forward," "rearward," "left," "right," "transverse," "upward" and "downward" as well as any other similar directional terms refer to those directions which are determined on the basis of the rider who sits on the saddle B3 of the bicycle 10 with facing the handlebar B2, for example. Accordingly, these terms, as utilized to describe the bicycle 10 including the bicycle chain 12 should be interpreted relative to the bicycle 10 as used in an upright riding position on a horizontal surface as illustrated in FIG. 1. These terms, as utilized to describe the bicycle chain 12, should be interpreted relative to the bicycle chain 12 as mounted on the bicycle 10 used in an upright riding position on a horizontal surface as illustrated in FIG. 1.

Figure 2:
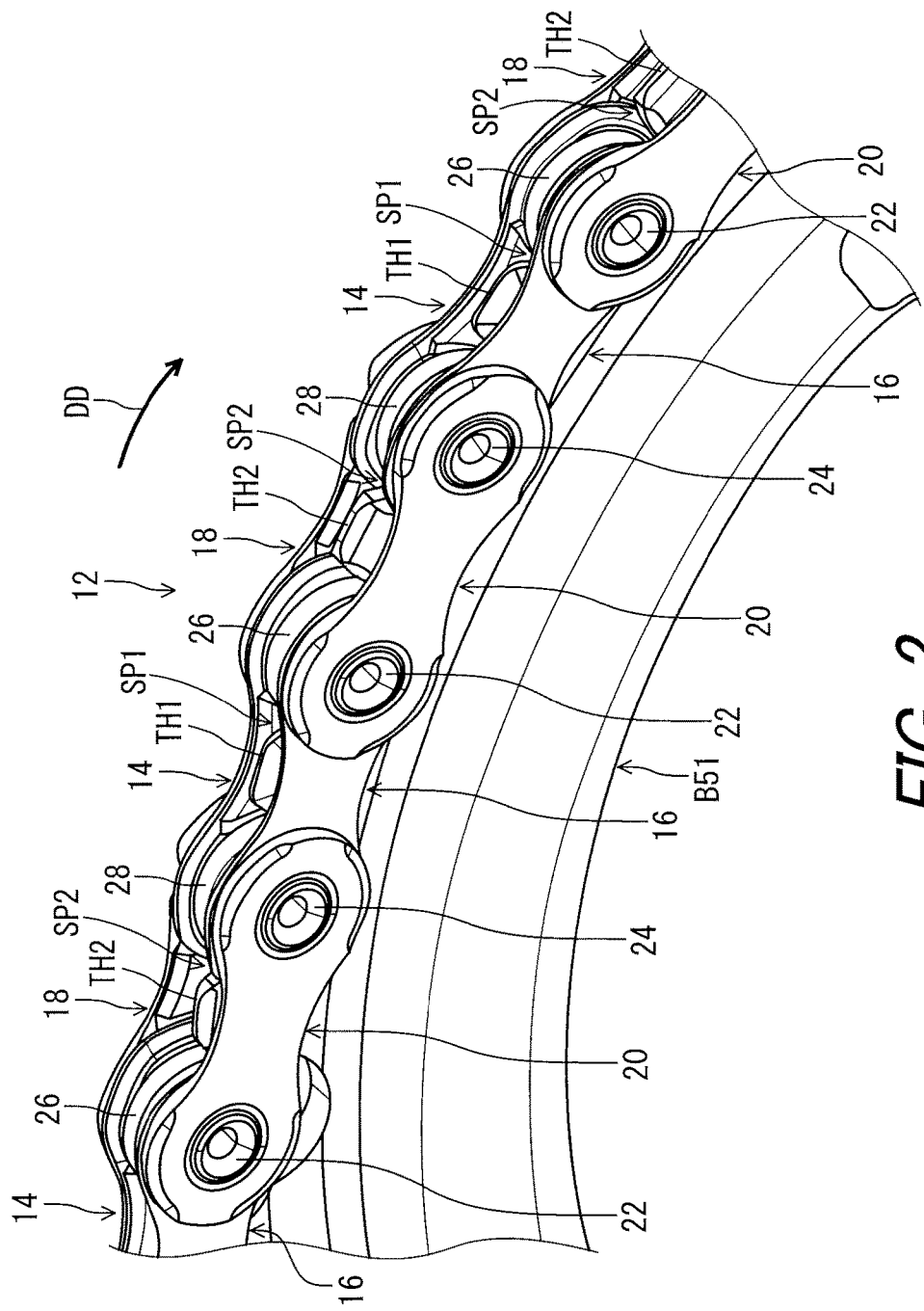
FIG. 2 is a partial perspective view of the bicycle chain illustrated in FIG. 1 with a sprocket.
Figure 3:
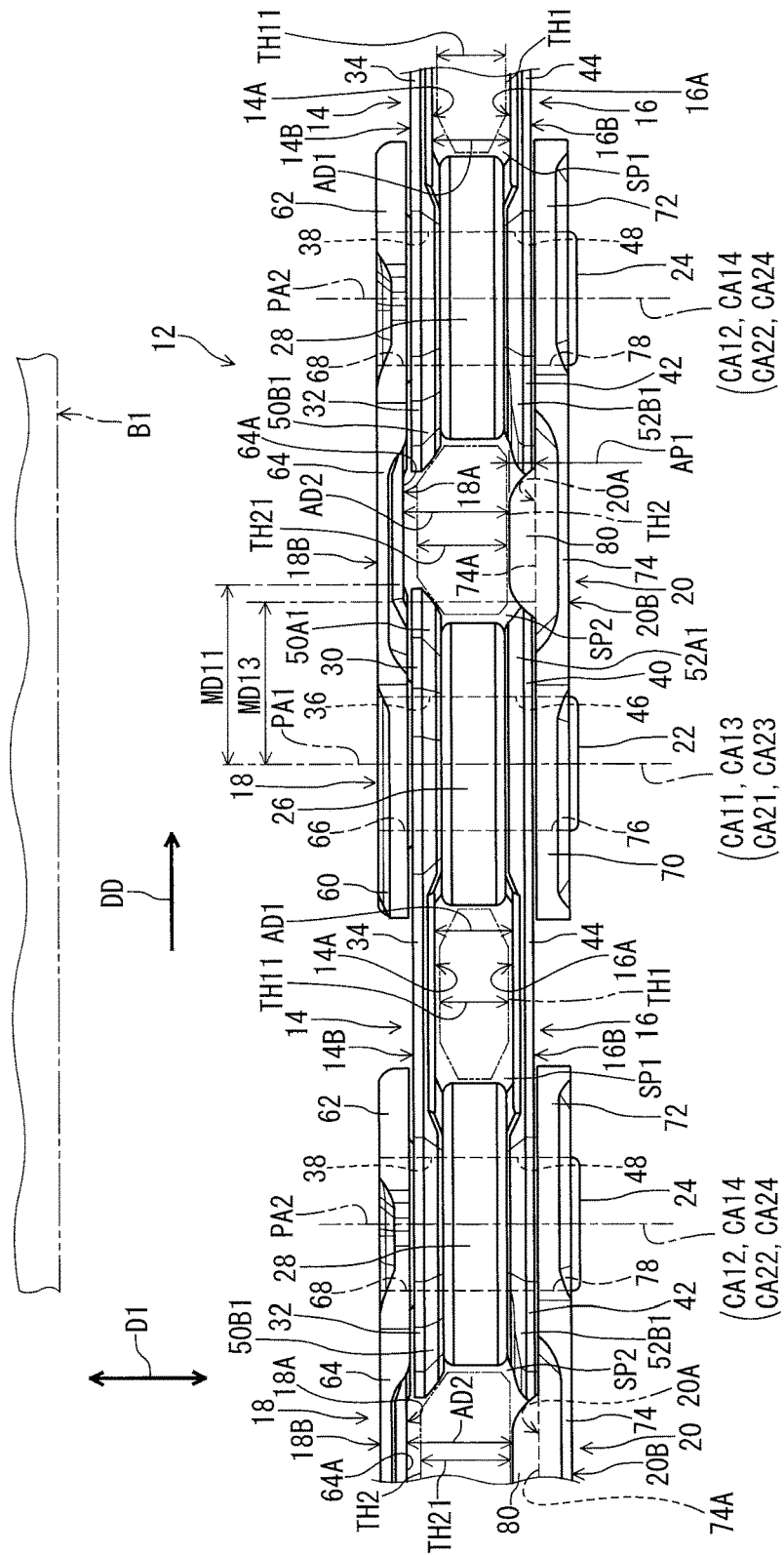
FIG. 3 is a partial plan view of the bicycle chain illustrated in FIG. 1.

As seen in FIGS. 2 and 3, the bicycle chain 12 comprises a first inner link plate 14, a second inner link plate 16, a first outer link plate 18, and a second outer link plate 20. In this embodiment, the bicycle chain 12 comprises a plurality of first inner link plates 14, a plurality of second inner link plates 16, a plurality of first outer link plates 18, and a plurality of second outer link plates 20. However, a total number of the first inner link plates 14, a total number of the second inner link plates 16, a total number of the first outer link plates 18, and a total number of the second outer link plates 20 are not limited to this embodiment. The bicycle chain 12 has a driving direction DD in which the bicycle chain 12 transmits a pedaling force during pedaling.

As seen in FIG. 3, the first inner link plate 14 is provided between the bicycle frame B1 and the second inner link plate 16 in a state where the bicycle chain 12 is mounted to the bicycle frame B1. Namely, the first inner link plate 14 is provided between the bicycle frame B1 and the second inner link plate 16 in a state where the bicycle chain 12 is engaged with the bicycle sprocket B51. The first outer link plate 18 is provided between the bicycle frame B1 and the second outer link plate 20 in the state where the bicycle chain 12 is mounted to the bicycle frame B1. However, the second inner link plate 16 can be provided between the bicycle frame B1 and the first inner link plate 14 in the state where the bicycle chain 12 is mounted to the bicycle frame B1. The second outer link plate 20 is provided between the bicycle frame B1 and the first outer link plate 18 in the state where the bicycle chain 12 is mounted to the bicycle frame B1.

As seen in FIG. 3, the first inner link plate 14 is provided between the first outer link plate 18 and the second inner link plate 16 in the axial direction D1 of the first inner-link center axis CA11. The second inner link plate 16 is provided between the first inner link plate 14 and the second outer link plate 20 in the axial direction D1. However, the second inner link plate 16 can be provided between the first outer link plate 18 and the first inner link plate 14 in the axial direction D1. The first inner link plate 14 can be provided between the second outer link plate 20 and the second inner link plate 16 in the axial direction D1.

The first inner link plate 14 includes a first inner surface 14A and a first outer surface 14B. The first inner surface 14A faces toward the second inner link plate 16. The first outer surface 14B is provided on a reverse side of the first inner surface 14A in the axial direction D1.

The second inner link plate 16 includes a second inner surface 16A and a second outer surface 16B. The second inner surface 16A faces toward the first inner link plate 14. The second outer surface 16B is provided on a reverse side of the second inner surface 16A in the axial direction D1.

The first outer link plate 18 includes a third inner surface 18A and a third outer surface 18B. The third inner surface 18A faces toward the second outer link plate 20. The third outer surface 18B is provided on a reverse side of the third inner surface 18A in the axial direction D1.

The second outer link plate 20 includes a fourth inner surface 20A and a fourth outer surface 20B. The fourth inner surface 20A faces toward the first outer link plate 18. The fourth outer surface 20B is provided on a reverse side of the fourth inner surface 20A in the axial direction D1.

The bicycle chain 12 further comprises a first link pin 22, a second link pin 24, a first chain roller 26, and a second chain roller 28. An opposed pair of the first and second inner link plates 14 and 16 are pivotally coupled to an opposed pair of the first and second outer link plates 18 and 20 about a first pivot axis PA1 with the first link pin 22. The opposed pair of the inner link plate 14 and 16 are pivotally coupled to another opposed pair of the first and second outer link plates 18 and 20 about a second pivot axis PA2 with the second link pin 24. The first link pin 22 defines the first pivot axis PA1. The second link pin 24 defines the second pivot axis PA2. The first chain roller 26 is rotatably mounted to the opposed pair of the inner link plates 14 and 16 about the first pivot axis PA1. The second chain roller 28 is rotatably mounted to the opposed pair of the inner link plates 14 and 16 about the second pivot axis PA2.

As seen in FIG. 2, the bicycle sprocket B51 includes a plurality of first teeth TH1 and a plurality of second teeth TH2. The first tooth TH1 is engaged in an inner link space SP1 provided between the first inner link plate 14 and the second inner link plate 16. The second tooth TH2 is engaged in an outer link space SP2 provided between the first outer link plate 18 and the second outer link plate 20.

As seen in FIGS. 4 to 8, the first inner link plate 14 comprises a first inner-link end portion 30, a second inner-link end portion 32, and a first inner-link intermediate portion 34. The first inner-link end portion 30 includes a first inner-link opening 36 having a first inner-link center axis CA11. The second inner-link end portion 32 includes a second inner-link opening 38 having a second inner-link center axis CA12. The second inner-link center axis CA12 extends along the first inner-link center axis CA11. The second inner-link center axis CA12 is spaced apart from the first inner-link center axis CA11 in a first inner-link longitudinal direction D21. The first inner-link intermediate portion 34 interconnects the first inner-link end portion 30 and the second inner-link end portion 32. As seen in FIG. 3, the first link pin 22 extends through the first inner-link opening 36. The second link pin 24 extends through the second inner-link opening 38. The first inner-link end portion 30 is provided on a downstream side of the second inner-link end portion 32 in the driving direction DD.

Figure 4:
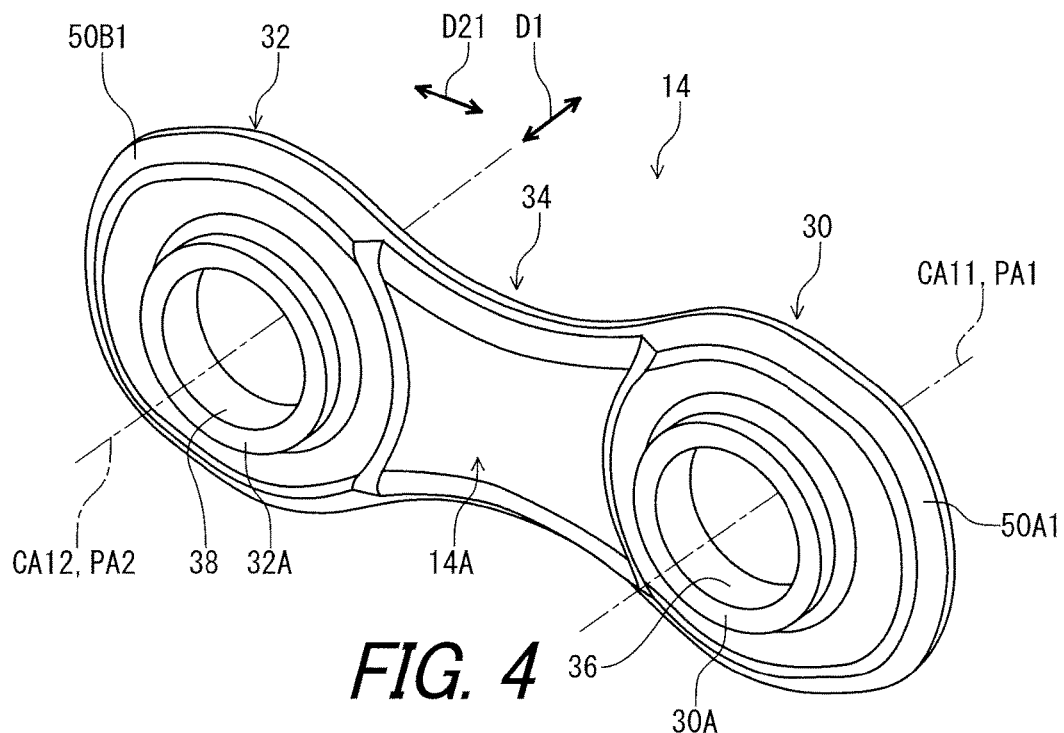
FIG. 4 is a perspective view of a first inner link plate of the bicycle chain illustrated in FIG. 1.
Figure 5:
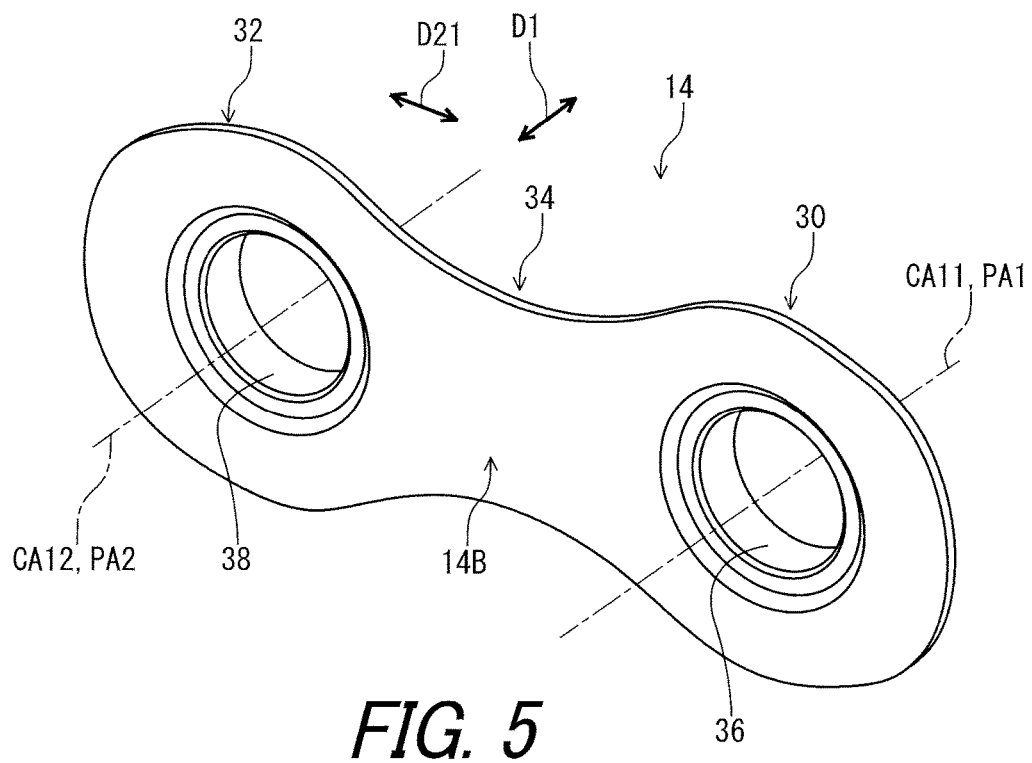
FIG. 5 is another perspective view of the first inner link plate of the bicycle chain illustrated in FIG. 1.

As seen in FIG. 4, the first inner-link end portion 30 includes a first tubular portion 30A extending from the first inner surface 14A in the axial direction D1 to support the first chain roller 26 (FIG. 3). The second inner-link end portion 32 includes a second tubular portion 32A extending from the first inner surface 14A in the axial direction D1 to support the second chain roller 28 (FIG. 3).

Figure 6:
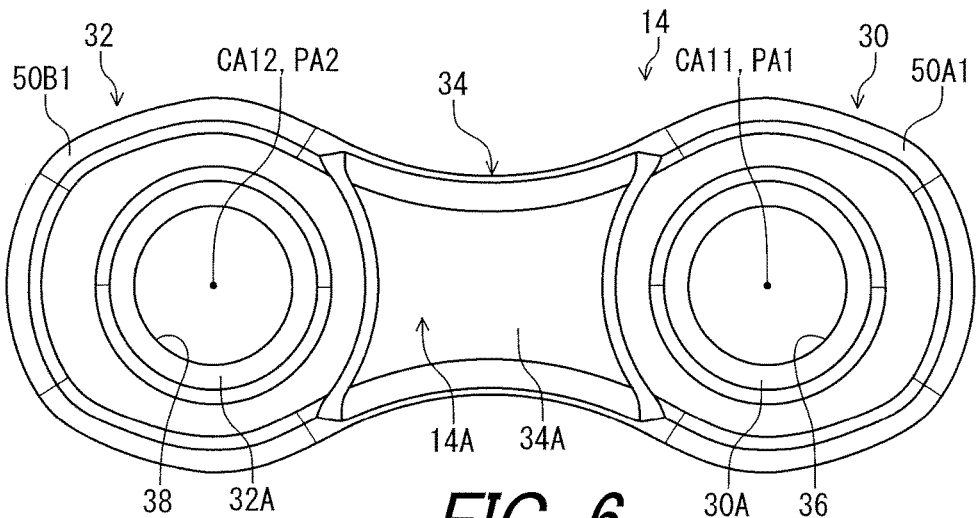
FIG. 6 is a side elevational view of the first inner link plate of the bicycle chain illustrated in FIG. 1.

As seen in FIG. 6, the first tubular portion 30A surrounds the first inner-link opening 36 when viewed along the first inner-link center axis CA11. The second tubular portion 32A surrounds the second inner-link opening 38 when viewed along the second inner-link center axis CA12. The first tubular portion 30A includes the first inner-link opening 36. The second tubular portion 32A includes the second inner-link opening 38.

Figure 7:
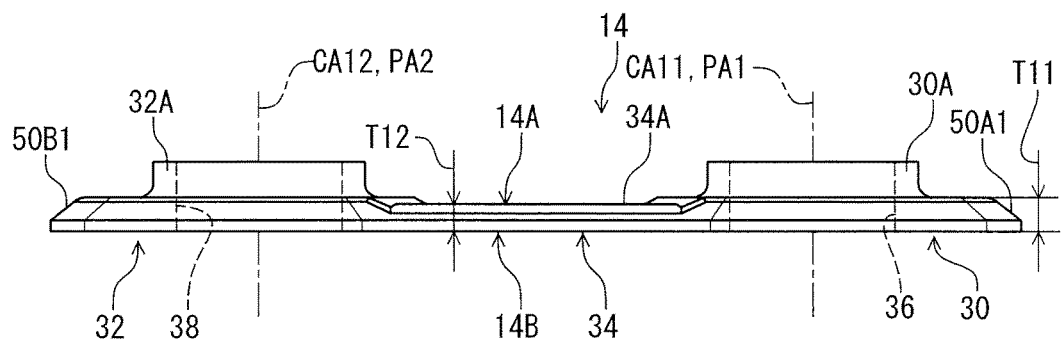
FIG. 7 is a bottom view of the first inner link plate of the bicycle chain illustrated in FIG. 1.
Figure 8:
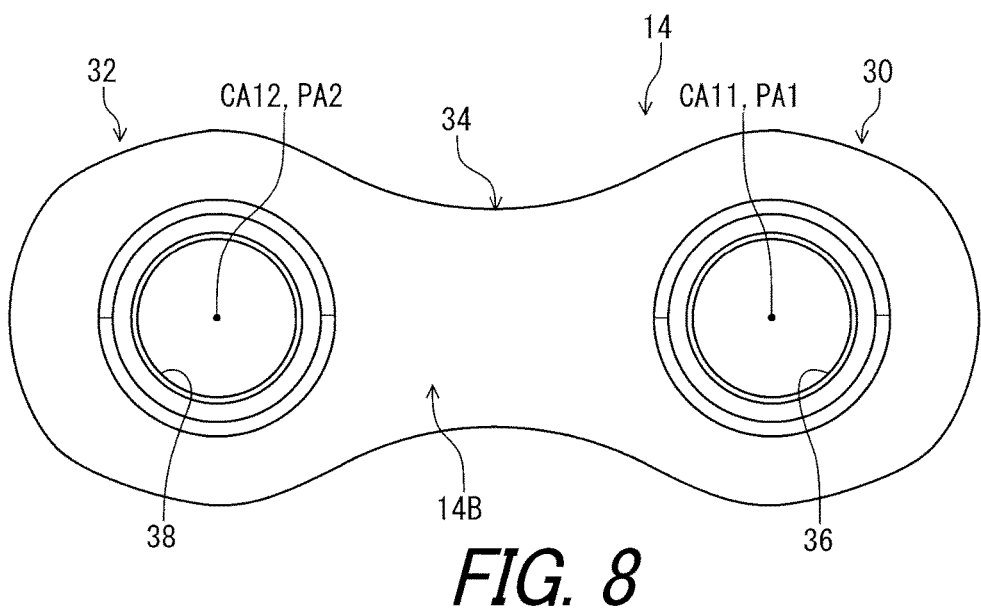
FIG. 8 is another side elevational view of the first inner link plate of the bicycle chain illustrated in FIG. 1.
Figure 9:
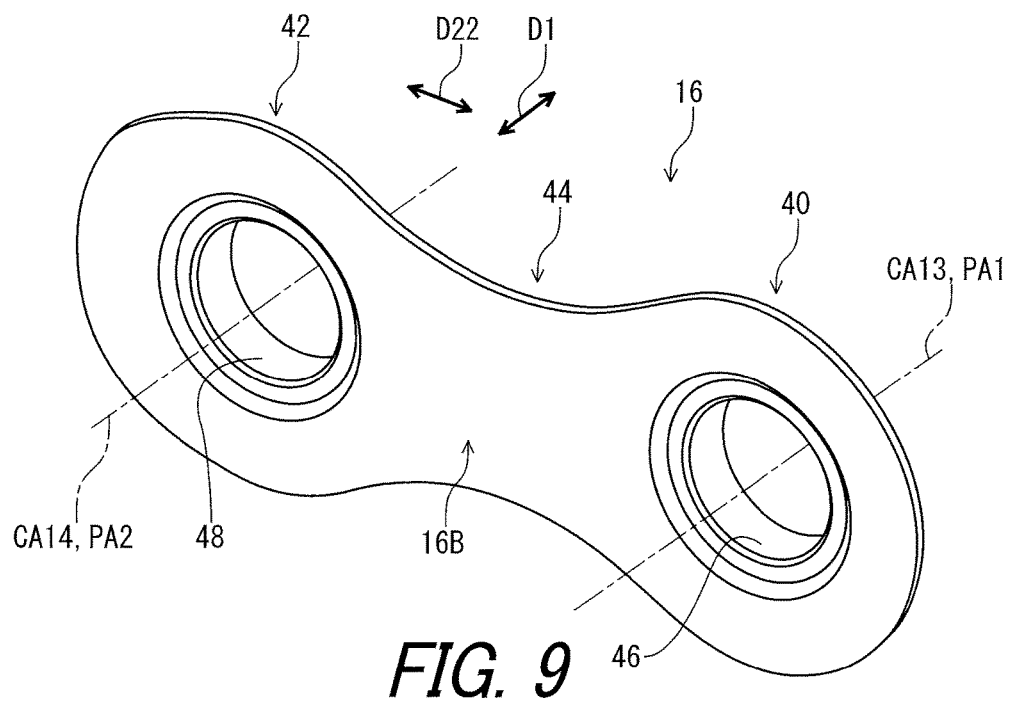
FIG. 9 is a perspective view of a second inner link plate of the bicycle chain illustrated in FIG. 1.

As seen in FIG. 7, a first axial thickness T11 is defined from the first outer surface 14B to the first inner surface 14A with respect to the first inner-link end portion 30. The first axial thickness T11 is equal to or smaller than 0.9 mm. More preferably, the first axial thickness T11 is equal to or smaller than 0.79 mm. The first inner-link intermediate portion 34 includes a recessed portion 34A. A second axial thickness T12 is defined from the first outer surface 14B to the first inner surface 14A with respect to the first inner-link intermediate portion 34. The second axial thickness T12 is smaller than the first axial thickness T11.

As seen in FIGS. 9 to 13, the second inner link plate 16 comprises a third inner-link end portion 40, a fourth inner-link end portion 42, and a second inner-link intermediate portion 44. The third inner-link end portion 40 includes a third inner-link opening 46 having a third inner-link center axis CA13. The fourth inner-link end portion 42 includes a fourth inner-link opening 48 having a fourth inner-link center axis CA14. The fourth inner-link center axis CA14 is spaced apart from the third inner-link center axis CA13 in a second inner-link longitudinal direction D22. The second inner-link intermediate portion 44 interconnects the third inner-link end portion 40 and the fourth inner-link end portion 42.

As seen in FIG. 3, the third inner-link center axis CA13 extends through the first inner-link opening 36. The fourth inner-link center axis CA14 extends through the second inner-link opening 38. The third inner-link center axis CA13 is substantially coincident with the first inner-link center axis CA11. The fourth inner-link center axis CA14 is substantially coincident with the second inner-link center axis CA12. However, the third inner-link center axis CA13 can be offset from the first inner-link center axis CA11. The fourth inner-link center axis CA14 can be offset from the second inner-link center axis CA12. The third inner-link end portion 40 is provided on a downstream side of the fourth inner-link end portion 42 in the driving direction DD.

Figure 10:
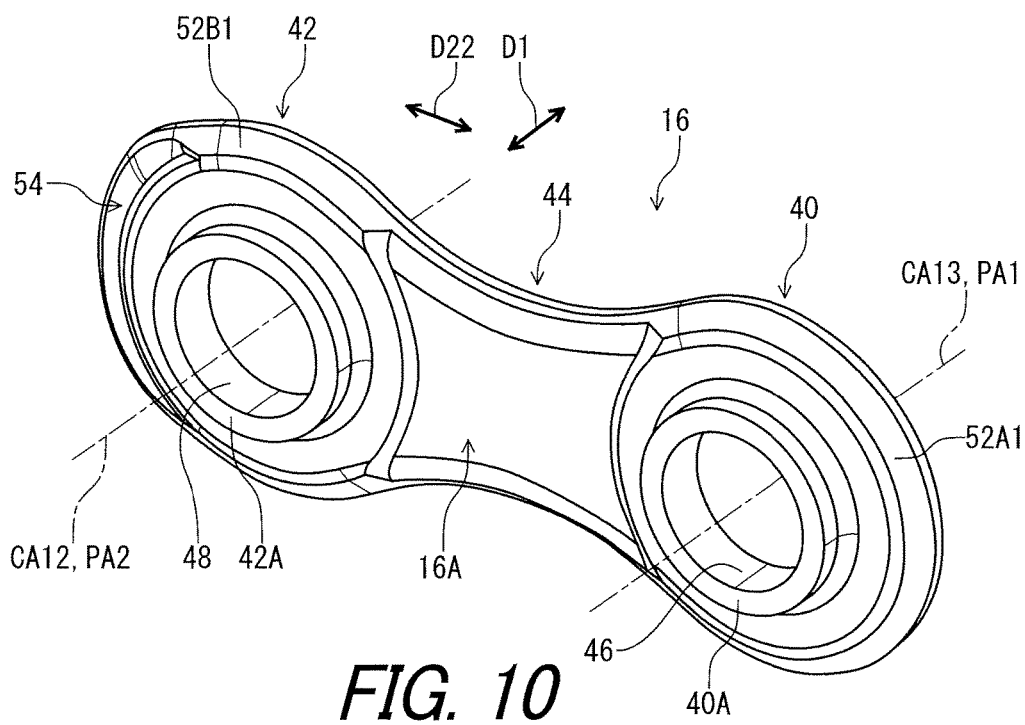
FIG. 10 is another perspective view of the second inner link plate of the bicycle chain illustrated in FIG. 1.
Figure 11:
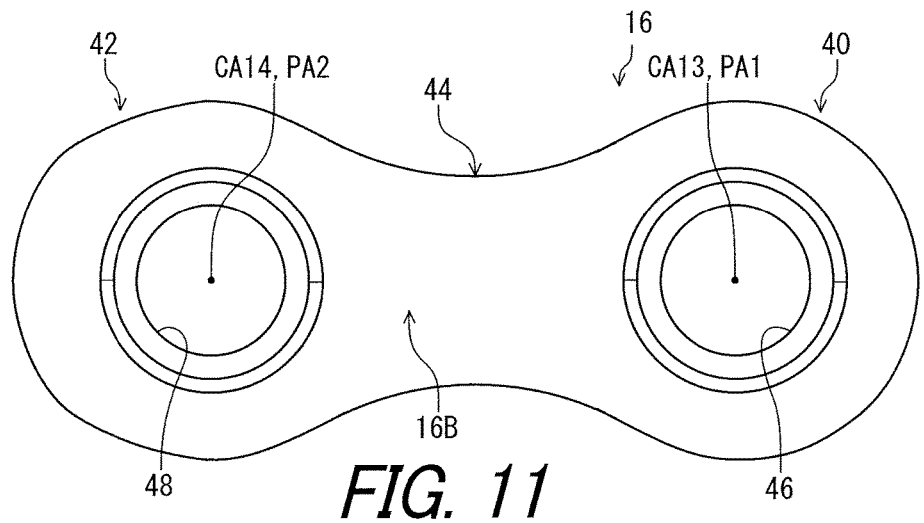
FIG. 11 is a side elevational view of the second inner link plate of the bicycle chain illustrated in FIG. 1.

As seen in FIG. 10, the third inner-link end portion 40 includes a third tubular portion 40A extending from the second inner surface 16A in the axial direction D1 to support the first chain roller 26 (FIG. 3). The fourth inner-link end portion 42 includes a fourth tubular portion 42A extending from the second inner surface 16A in the axial direction D1 to support the second chain roller 28 (FIG. 3).

Figure 13:
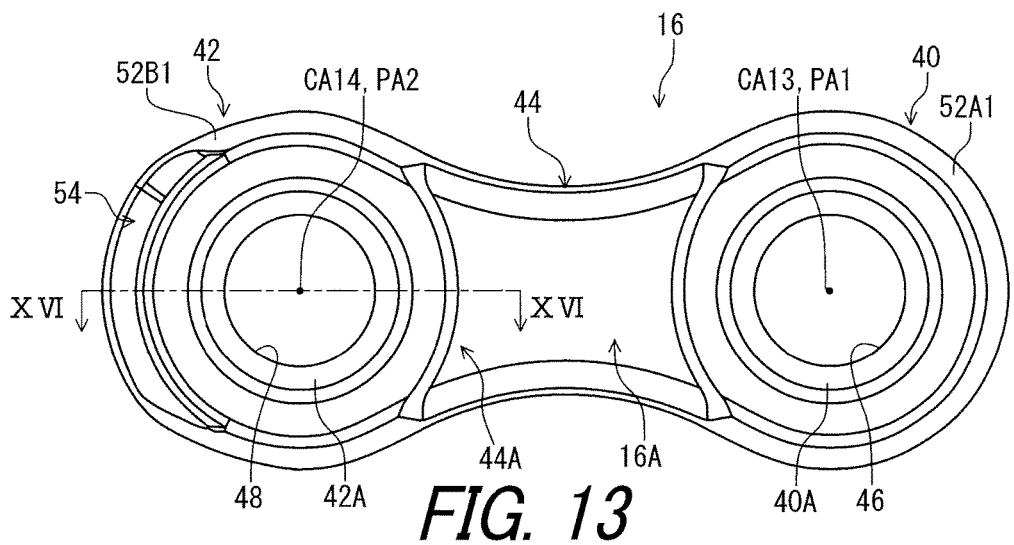
FIG. 13 is another side elevational view of the second inner link plate of the bicycle chain illustrated in FIG. 1.

As seen in FIG. 13, the third tubular portion 40A surrounds the third inner-link opening 46 when viewed along the third inner-link center axis CA13. The fourth tubular portion 42A surrounds the fourth inner-link opening 48 when viewed along the fourth inner-link center axis CA14. The third tubular portion 40A includes the third inner-link opening 46. The fourth tubular portion 42A includes the fourth inner-link opening 48.

Figure 12:
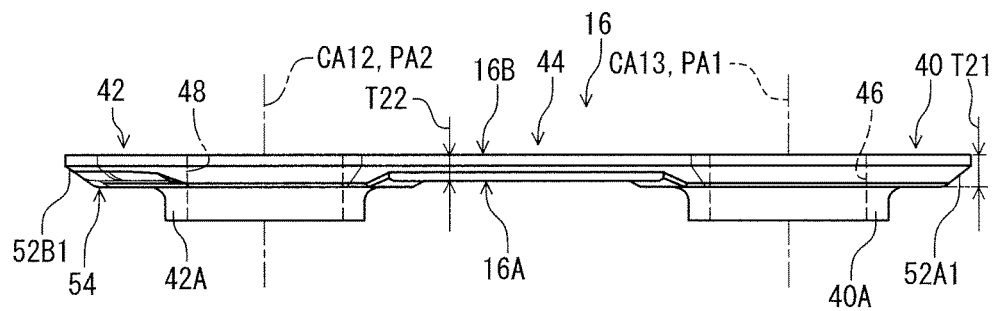
FIG. 12 is a bottom view of the second inner link plate of the bicycle chain illustrated in FIG. 1.

As seen in FIG. 12, a third axial thickness T21 is defined from the second outer surface 16B to the second inner surface 16A with respect to the third inner-link end portion 40. The second inner-link intermediate portion 44 includes a recessed portion 44A. A fourth axial thickness T22 is defined from the second outer surface 16B to the second inner surface 16A with respect to the second inner-link intermediate portion 44. The fourth axial thickness T22 is smaller than the third axial thickness T21. In this embodiment, the third axial thickness T21 is substantially equal to the first axial thickness T11. However, the third axial thickness T21 can be different from the first axial thickness T11.

Figure 14:
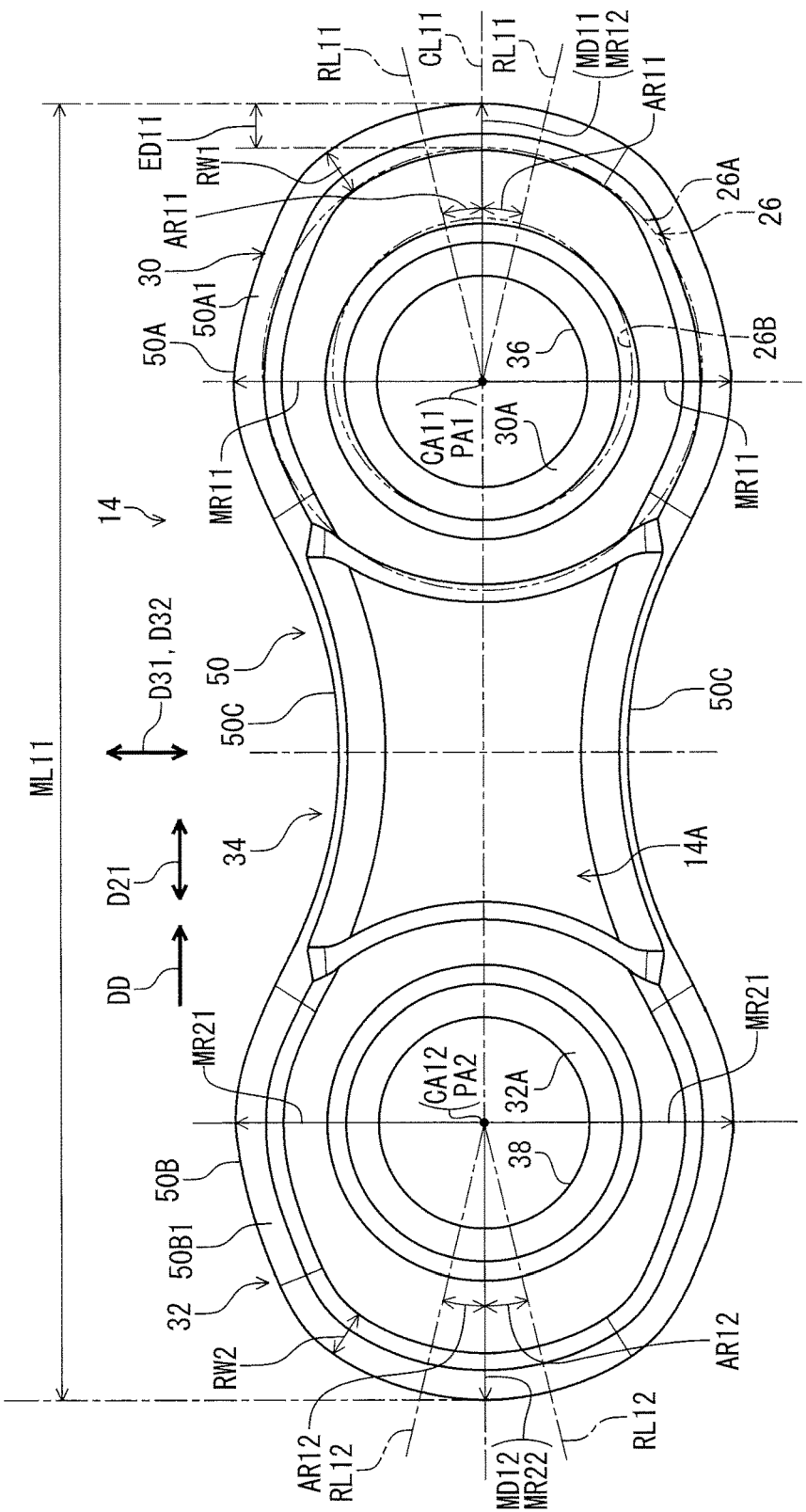
FIG. 14 is an enlarged side elevational view of the first inner link plate of the bicycle chain illustrated in FIG. 1.

As seen in FIG. 14, the first inner-link end portion 30, the second inner-link end portion 32 and the first inner-link intermediate portion 34 define a first inner-link outer peripheral edge 50. The first inner-link outer peripheral edge 50 comprises a first inner-link end edge 50A, a second inner-link end edge 50B, and a pair of first inner-link intermediate edges 50C. The first inner-link end edge 50A extends about the first inner-link end portion 30. The second inner-link end edge 50B extends about the second inner-link end portion 32. The pair of first inner-link intermediate edges 50C extends along the first inner-link intermediate portion 34 between the first inner-link end edge 50A and the second inner-link end edge 50B.

Figure 15:
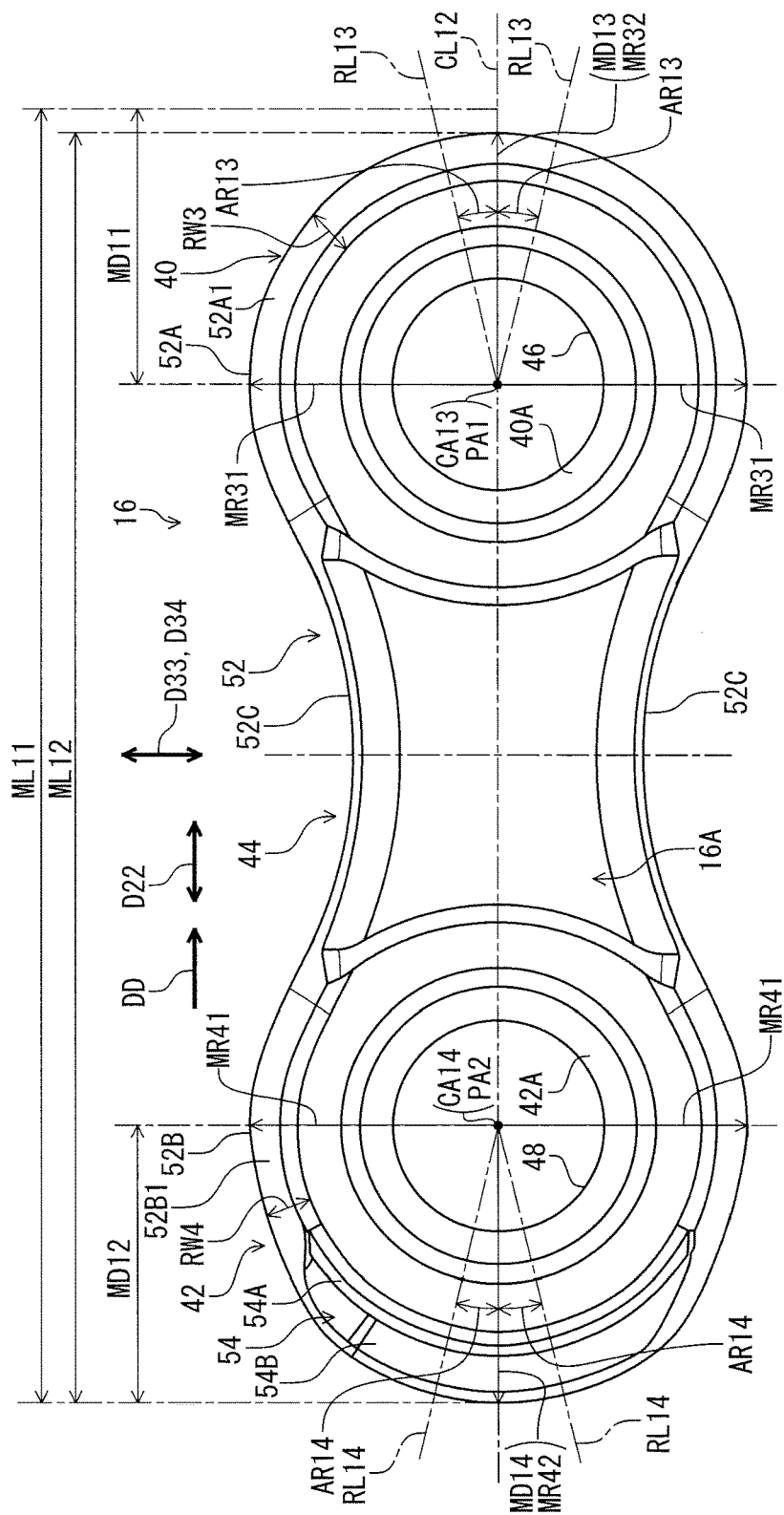
FIG. 15 is an enlarged side elevational view of the second inner link plate of the bicycle chain illustrated in FIG. 1.

As seen in FIG. 15, the third inner-link end portion 40, the fourth inner-link end portion 42 and the second inner-link intermediate portion 44 define a second inner-link outer peripheral edge 52. The second inner-link outer peripheral edge 52 comprises a third inner-link end edge 52A, a fourth inner-link end edge 52B, and a pair of second inner-link intermediate edges 52C. The third inner-link end edge 52A extends about the third inner-link end portion 40. The fourth inner-link end edge 52B extends about the fourth inner-link end portion 42. The pair of second inner-link intermediate edges 52C extends along the second inner-link intermediate portion 44 between the third inner-link end edge 52A and the fourth inner-link end edge 52B.

As seen in FIG. 14, a first maximum distance MD11 is defined from the first inner-link center axis CA11 to the first inner-link end edge 50A in the first inner-link longitudinal direction D21. A second maximum distance MD12 is defined from the second inner-link center axis CA12 to the second inner-link end edge 50B in the first inner-link longitudinal direction D21. In this embodiment, the second maximum distance MD12 is substantially equal to the first maximum distance MD11. However, the second maximum distance MD12 can be different from the first maximum distance MD11.

As seen in FIG. 15, a third maximum distance MD13 is defined from the third inner-link center axis CA13 to the third inner-link end edge 52A in the second inner-link longitudinal direction D22. A fourth maximum distance MD14 is defined from the fourth inner-link center axis CA14 to the fourth inner-link end edge 52B in the second inner-link longitudinal direction D22.

As seen in FIGS. 14 and 15, the first maximum distance MD11 is larger than the third maximum distance MD13. The third maximum distance MD13 is smaller than the fourth maximum distance MD14. The fourth maximum distance MD14 is substantially equal to the first maximum distance MD11 and the second maximum distance MD12. However, the first maximum distance MD11 can be substantially equal to or smaller than the third maximum distance MD13. The third maximum distance MD13 can be substantially equal to or larger than the fourth maximum distance MD14. The fourth maximum distance MD14 can be different from at least one of the first maximum distance MD11 and the second maximum distance MD12.

As seen in FIG. 14, the first inner link plate 14 has a first maximum length ML11 defined between the first inner-link end edge 50A and the second inner-link end edge 50B in the first inner-link longitudinal direction D21. As seen in FIG. 15, the second inner link plate 16 has a second maximum length ML12 defined between the third inner-link end edge 52A and the fourth inner-link end edge 52B in the second inner-link longitudinal direction D22. As seen in FIGS. 14 and 15, the first maximum length ML11 is larger than the second maximum length ML12. However, the first maximum length ML11 can be equal to or smaller than the second maximum length ML12.

As seen in FIG. 14, the first inner-link end edge 50A has a first chamfer 50A1 extending about the first inner-link center axis CA11 such that a part of the first chamfer 50A1 is disposed in a first circumferential area AR11. The first inner link plate 14 comprises a first inner-link longitudinal centerline CL11. The first circumferential area AR11 is defined from a first inner-link longitudinal centerline CL11 to the first reference line RL11 when viewed in the axial direction D1 of the first inner-link center axis CA11. The first inner-link longitudinal centerline CL11 is perpendicular to the first inner-link center axis CA11 and the second inner-link center axis CA12. The first reference line RL11 extends radially outwardly from the first inner-link center axis CA11. The first circumferential area AR11 is smaller than 14 degrees.

The first chamfer 50A1 overlaps with the first inner-link longitudinal centerline CL11 when viewed in the axial direction D1. The first chamfer 50A1 extends about the first inner-link center axis CA11 from one of the pair of first inner-link intermediate edges 50C to the other of the pair of first inner-link intermediate edges 50C. The first chamfer 50A1 has a first radial width RW1 defined in a radial direction with respect to the first inner-link center axis CA11. The first radial width RW1 is substantially constant from one of the pair of first inner-link intermediate edges 50C toward the first inner-link longitudinal centerline CL11 when viewed in the axial direction D1. However, the first radial width RW1 can be non-constant from one of the pair of first inner-link intermediate edges 50C toward the first inner-link longitudinal centerline CL11 when viewed in the axial direction D1.

The first inner-link end portion 30 has a first minimum radial distance MR11 and a first maximum radial distance MR12. The first minimum radial distance MR11 is defined from the first inner-link center axis CA11 to the first inner-link end edge 50A in a first perpendicular direction D31 perpendicular to the first inner-link longitudinal direction D21 and the first inner-link center axis CA11. The first maximum radial distance MR12 is defined from the first inner-link center axis CA11 to the first inner-link end edge 50A in the first inner-link longitudinal direction D21. The first maximum radial distance MR12 is equal to or larger than the first minimum radial distance MR11. The first minimum radial distance MR11 is equal to or larger than 4.36 mm. Preferably, the first maximum radial distance MR12 is 4.75 mm. The first maximum radial distance MR12 is equal to the first maximum distance MD11. However, the dimensional relationship among the first minimum radial distance MR11, the first maximum radial distance MR12, and the first maximum distance MD11 is not limited to this embodiment.

As seen in FIG. 14, the second inner-link end edge 50B has a second chamfer 50B1 extending about the second inner-link center axis CA12 such that a part of the second chamfer 50B1 is disposed in a second circumferential area AR12. The second circumferential area AR12 is defined from the first inner-link longitudinal centerline CL11 to a second reference line RL12 extending radially outwardly from the second inner-link center axis CA12 when viewed in the axial direction D1 of the second inner-link center axis CA12. The second circumferential area AR12 is smaller than 14 degrees.

The second chamfer 50B1 overlaps with the first inner-link longitudinal centerline CL11 when viewed in the axial direction D1. The second chamfer 50B1 extends about the second inner-link center axis CA12 from one of the pair of first inner-link intermediate edges 50C to the other of the pair of first inner-link intermediate edges 50C. The second chamfer 50B1 has a second radial width RW2 defined in a radial direction with respect to the second inner-link center axis CA12. The second radial width RW2 is substantially constant from one of the pair of first inner-link intermediate edges 50C toward the first inner-link longitudinal centerline CL11 when viewed in the axial direction D1. However, the second radial width RW2 can be non-constant from one of the pair of first inner-link intermediate edges 50C toward the first inner-link longitudinal centerline CL11 when viewed in the axial direction D1.

The second inner-link end portion 32 has a second minimum radial distance MR21 and a second maximum radial distance MR22. The second minimum radial distance MR21 is defined from the second inner-link center axis CA12 to the second inner-link end edge 50B in a second perpendicular direction D32 perpendicular to the first inner-link longitudinal direction D21 and the second inner-link center axis CA12. The second perpendicular direction D32 is parallel to the first perpendicular direction D31. However, the second perpendicular direction D32 can be angularly offset from the first perpendicular direction D31.

The second maximum radial distance MR22 is defined from the second inner-link center axis CA12 to the second inner-link end edge 50B in the first inner-link longitudinal direction D21. The second maximum radial distance MR22 is equal to or larger than the second minimum radial distance MR21. In this embodiment, the second minimum radial distance MR21 is equal to or larger than 4.36 mm. Preferably, the second maximum radial distance MR22 is 4.75 mm. The second maximum radial distance MR22 is equal to the second maximum distance MD12. However, the dimensional relationship among the second minimum radial distance MR21, the second maximum radial distance MR22, and the second maximum distance MD12 is not limited to this embodiment.

As seen in FIG. 15, the third inner-link end edge 52A has a third chamfer 52A1 extending about the third inner-link center axis CA13 such that a part of the third chamfer 52A1 is disposed in a third circumferential area AR13. The second inner link plate 16 comprises a second inner-link longitudinal centerline CL12. The third circumferential area AR13 is defined from the second inner-link longitudinal centerline CL12 to a third reference line RL13 when viewed in the axial direction D1 of the third inner-link center axis CA13. The second inner-link longitudinal centerline CL12 is perpendicular to the third inner-link center axis CA13 and the fourth inner-link center axis CA14. The third reference line RL13 extends radially outwardly from the third inner-link center axis CA13. The third circumferential area AR13 is smaller than 14 degrees.

The third chamfer 52A1 overlaps with the second inner-link longitudinal centerline CL12 when viewed in the axial direction D1. The third chamfer 52A1 extends about the third inner-link center axis CA13 from one of the pair of second inner-link intermediate edges 52C to the other of the pair of second inner-link intermediate edges 52C. The third chamfer 52A1 has a third radial width RW3 defined in a radial direction with respect to the third inner-link center axis CA13. The third radial width RW3 is substantially constant from one of the pair of second inner-link intermediate edges 52C toward the second inner-link longitudinal centerline CL12 when viewed in the axial direction D1. However, the third radial width RW3 can be non-constant from one of the pair of second inner-link intermediate edges 52C toward the second inner-link longitudinal centerline CL12 when viewed in the axial direction D1.

The third inner-link end portion 40 has a third minimum radial distance MR31 and a third maximum radial distance MR32. The third minimum radial distance MR31 is defined from the third inner-link center axis CA13 to the third inner-link end edge 52A in a third perpendicular direction D33 perpendicular to the second inner-link longitudinal direction D22 and the third inner-link center axis CA13. The third maximum radial distance MR32 is defined from the third inner-link center axis CA13 to the third inner-link end edge 52A in the second inner-link longitudinal direction D22. The third maximum radial distance MR32 is equal to or larger than the third minimum radial distance MR31. The third minimum radial distance MR31 is equal to or larger than 4.36 mm. Preferably, the third maximum radial distance MR32 is 4.75 mm. The third maximum radial distance MR32 is equal to the third maximum distance MD13. However, the dimensional relationship among the third minimum radial distance MR31, the third maximum radial distance MR32, and the third maximum distance MD13 is not limited to this embodiment.

As seen in FIG. 15, the fourth inner-link end edge 52B has a fourth chamfer 52B1 extending about the fourth inner-link center axis CA14. The fourth chamfer 52B1 extends about the fourth inner-link center axis CA14 such that a part of the fourth chamfer 52B1 is disposed in a fourth circumferential area AR14. The fourth circumferential area AR14 is defined from the second inner-link longitudinal centerline CL12 to a fourth reference line RL14 when viewed in the axial direction D1 of the fourth inner-link center axis CA14. The fourth reference line RL14 extends radially outwardly from the fourth inner-link center axis CA14. The fourth circumferential area AR14 is smaller than 14 degrees.

The fourth chamfer 52B1 overlaps with the second inner-link longitudinal centerline CL12 when viewed in the axial direction D1. The fourth chamfer 52B1 extends about the fourth inner-link center axis CA14 from one of the pair of second inner-link intermediate edges 52C to the other of the pair of second inner-link intermediate edges 52C. The fourth chamfer 52B1 has a fourth radial width RW4 defined in a radial direction with respect to the fourth inner-link center axis CA14. The fourth radial width RW4 increases from one of the pair of second inner-link intermediate edges 52C toward the second inner-link longitudinal centerline CL12 when viewed in the axial direction D1. However, the fourth radial width RW4 can be constant from one of the pair of second inner-link intermediate edges 52C toward the second inner-link longitudinal centerline CL12 when viewed in the axial direction D1.

The fourth inner-link end portion 42 has a fourth minimum radial distance MR41 and a fourth maximum radial distance MR42. The fourth minimum radial distance MR41 is defined from the fourth inner-link center axis CA14 to the fourth inner-link end edge 52B in a fourth perpendicular direction D34 perpendicular to the second inner-link longitudinal direction D22 and the fourth inner-link center axis CA14. The fourth perpendicular direction D34 is parallel to the third perpendicular direction D33. However, the fourth perpendicular direction D34 can be angularly offset from the third perpendicular direction D33.

The fourth maximum radial distance MR42 is defined from the fourth inner-link center axis CA14 to the fourth inner-link end edge 52B in the second inner-link longitudinal direction D22. The fourth maximum radial distance MR42 is equal to or larger than the fourth minimum radial distance MR41. The fourth minimum radial distance MR41 is equal to or larger than 4.36 mm. Preferably, the fourth maximum radial distance MR42 is 4.75 mm. The fourth maximum radial distance MR42 is equal to the fourth maximum distance MD14. However, the dimensional relationship among the fourth minimum radial distance MR41, the fourth maximum radial distance MR42, and the fourth maximum distance MD14 is not limited to this embodiment.

As seen in FIGS. 10 and 15, the fourth chamfer 52B1 includes a stepped part 54. The stepped part 54 extends about the fourth inner-link center axis CA14. The stepped part 54 includes a first surface 54A and a second surface 54B. The first surface 54A and the second surface 54B are provided in the fourth chamfer 52B1. The first surface 54A is provided between the second surface 54B and the second inner surface 16A of the second inner link plate 16.

Figure 16:
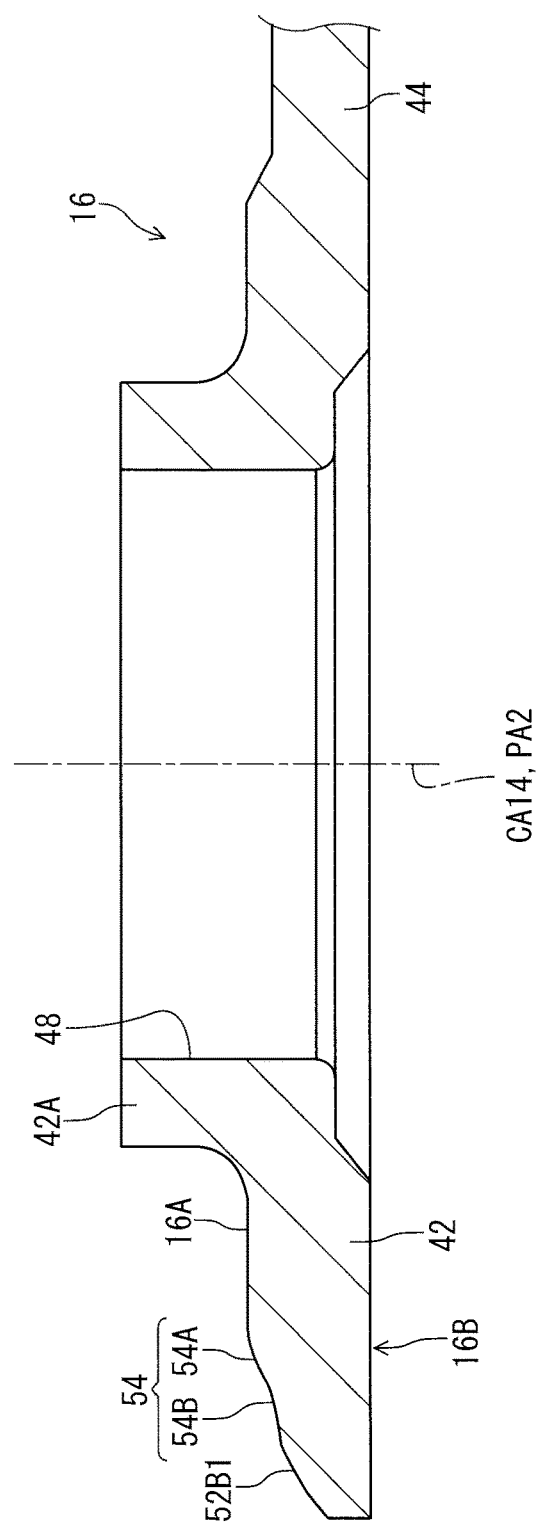
FIG. 16 is a cross sectional view of the inner link plate taken along line XVI-XVI of the FIG. 13.
Figure 17:
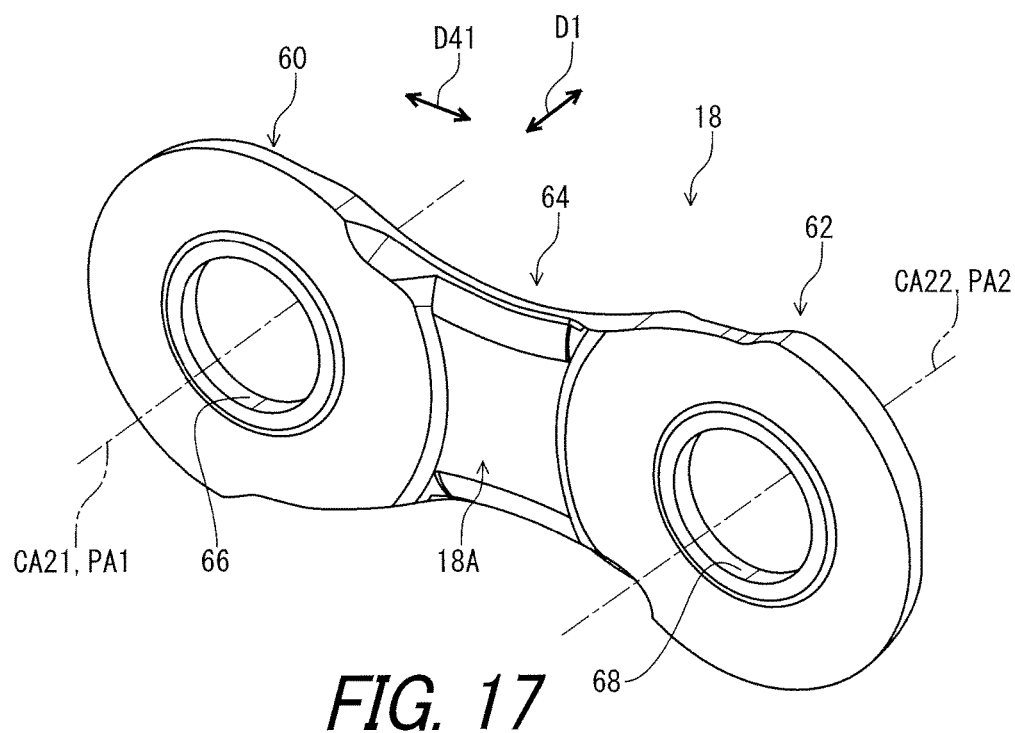
FIG. 17 is a perspective view of a first outer link plate of the bicycle chain illustrated in FIG. 1.
Figure 18:
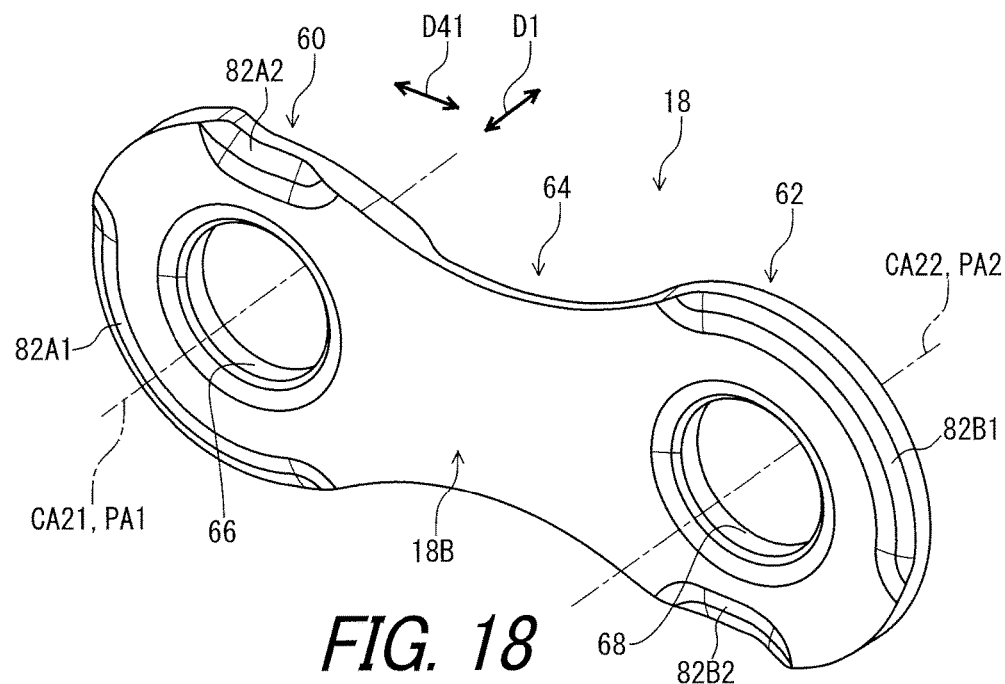
FIG. 18 is another perspective view of the first outer link plate of the bicycle chain illustrated in FIG. 1.
Figure 19:
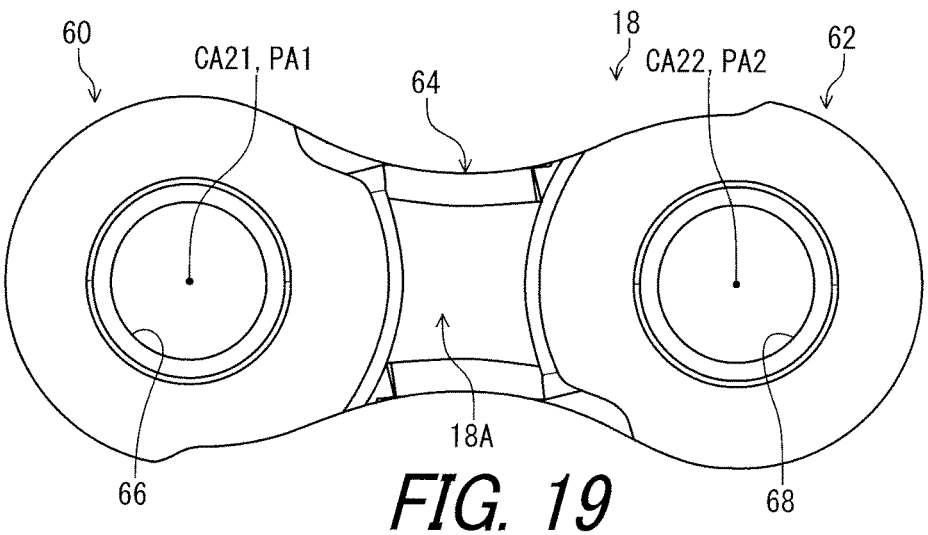
FIG. 19 is a side elevational view of the first outer link plate of the bicycle chain illustrated in FIG. 1.
Figure 20:
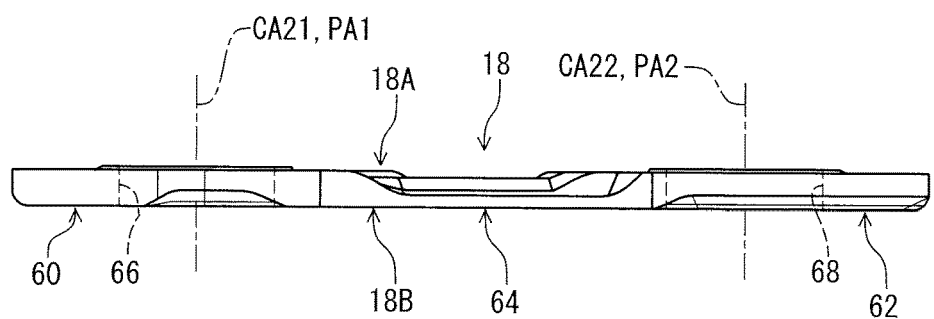
FIG. 20 is a bottom view of the first outer link plate of the bicycle chain illustrated in FIG. 1.
Figure 21:
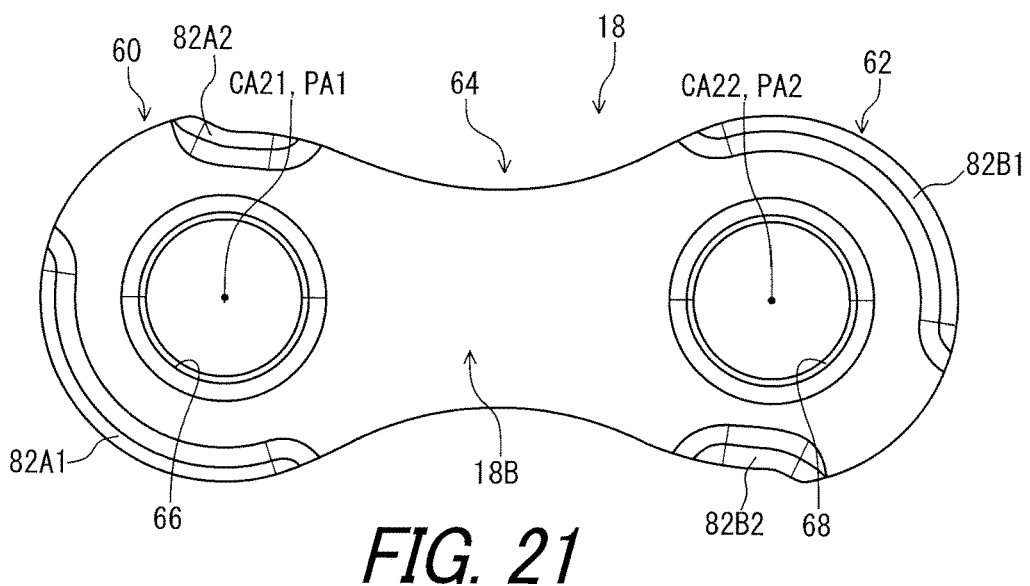
FIG. 21 is another side elevational view of the first outer link plate of the bicycle chain illustrated in FIG. 1.
Figure 22:
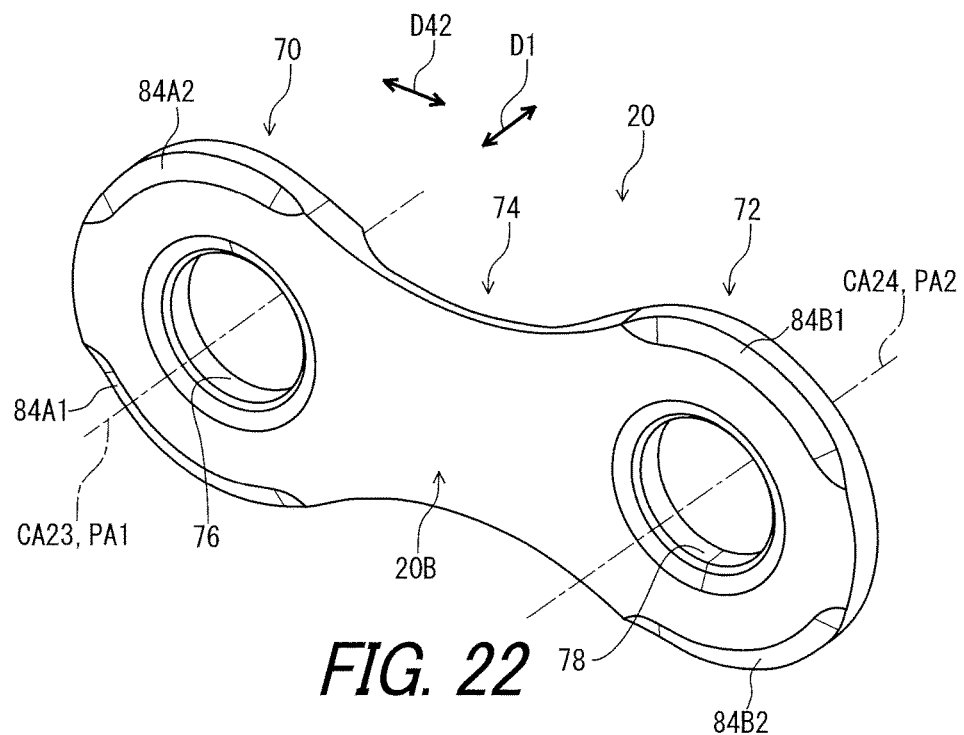
FIG. 22 is a perspective view of a second outer link plate of the bicycle chain illustrated in FIG. 1.
Figure 23:
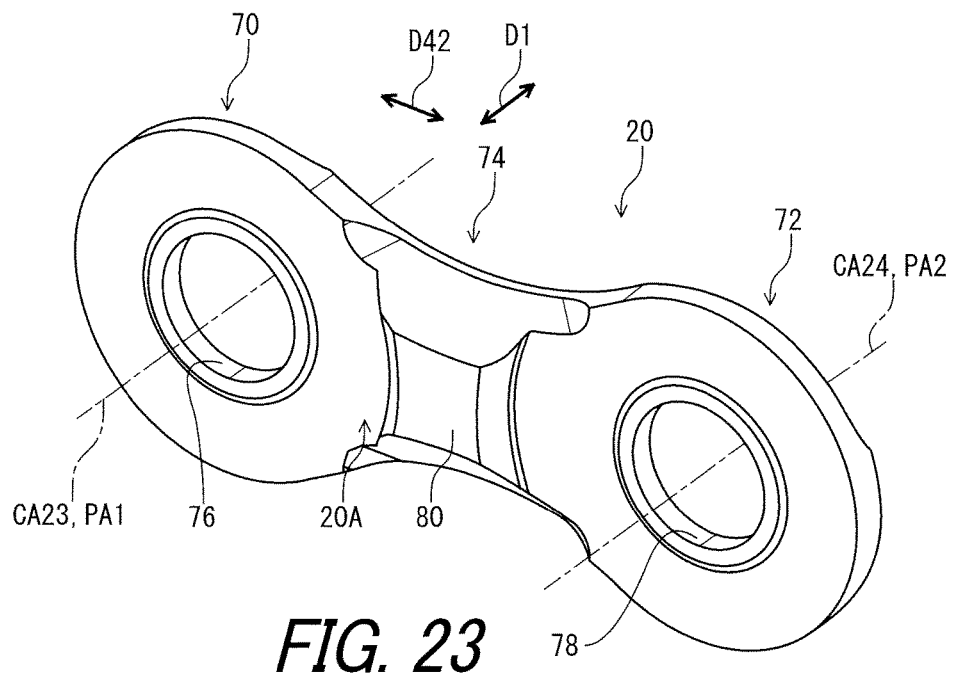
FIG. 23 is another perspective view of the second outer link plate of the bicycle chain illustrated in FIG. 1.
Figure 24:
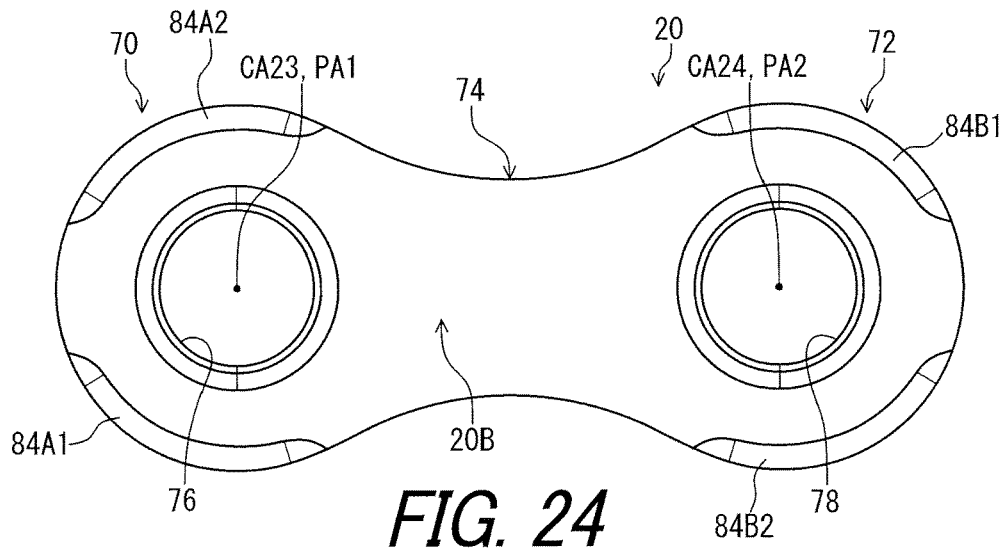
FIG. 24 is a side elevational view of the second outer link plate of the bicycle chain illustrated in FIG. 1.
Figure 25:
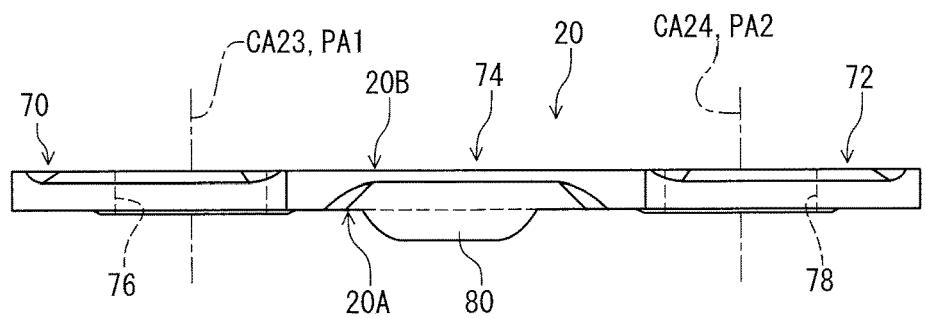
FIG. 25 is a bottom view of the second outer link plate of the bicycle chain illustrated in FIG. 1.
Figure 26:
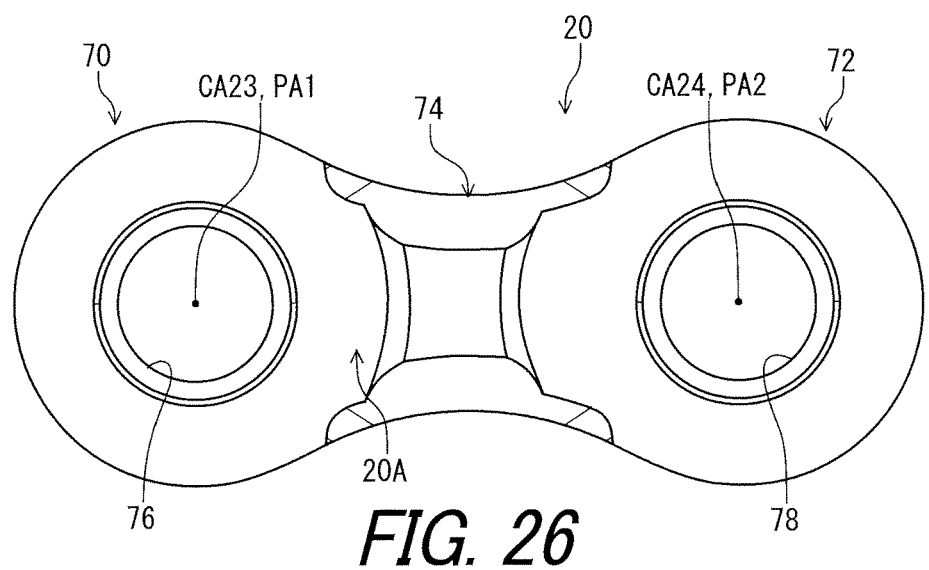
FIG. 26 is another side elevational view of the second outer link plate of the bicycle chain illustrated in FIG. 1.

As seen in FIG. 16, the second surface 54B is inclined relative to the first surface 54A and the fourth chamfer 52B1. The first surface 54A and the second surface 54B are inclined relative to the second inner surface 16A. The first surface 54A and the second surface 54B are provided between the second inner surface 16A and the second outer surface 16B in the axial direction D1. The first surface 54A and the second surface 54B provide a recess in the fourth chamfer 52B1.

As seen in FIG. 14, the first chain roller 26 includes a first radially outer circumferential surface 26A and a first radially inner circumferential surface 26B provided radially inwardly of the first radially outer circumferential surface 26A. A first extended distance ED11 is defined between an edge of the first chamfer 50A1 and a part of the first radially outer circumferential surface 26A of the first chain roller 26 in the first inner-link longitudinal direction D21 when the first chain roller 26 moves toward the first inner-link end portion 30 in the first inner-link longitudinal direction D21 until the first radially inner circumferential surface 26B of the first chain roller 26 contacts the first tubular portion 30A. The first extended distance ED11 ranges from 0.95 mm to 1.1 mm.

As seen in FIG. 3, the first chamfer 50A1 is inclined to make the first inner-link end portion 30 of the first inner link plate 14 suitable for an outline of the second tooth TH2 when the second tooth TH2 is engaged in the outer link space SP2. The second chamfer 50B1 is inclined to make the second inner-link end portion 32 of the first inner link plate 14 suitable for the outline of the second tooth TH2 when the second tooth TH2 is engaged in the outer link space SP2. Furthermore, since the first maximum distance MD11 is larger than the third maximum distance MD13, it is possible to make the first inner-link end portion 30 of the first inner link plate 14 more suitable for an outline of the second tooth TH2 when the second tooth TH2 is engaged in the outer link space SP2. The above features improve chain-holding performance between the bicycle sprocket B51 and the bicycle chain 12.

As seen in FIGS. 17 to 21, the first outer link plate 18 comprises a first outer-link end portion 60, a second outer-link end portion 62, and a first outer-link intermediate portion 64. The first outer-link end portion 60 includes a first outer-link opening (a first outer-link circular opening) 66 having a first outer-link center axis CA21. The second outer-link end portion 62 includes a second outer-link opening (a second outer-link circular opening) 68 having a second outer-link center axis CA22. The second outer-link center axis CA22 extends along the first outer-link center axis CA21. In this embodiment, the first outer-link opening 66 is a circular opening, and the second outer-link opening 68 is a circular opening. Thus, the first outer-link opening 66 can also be referred to as a first outer-link circular opening 66. The second outer-link opening 68 can also be referred to as a second outer-link circular opening 68. The second outer-link center axis CA22 is spaced apart from the first outer-link center axis CA21 in a first outer-link longitudinal direction D41. The first outer-link intermediate portion 64 interconnects the first outer-link end portion 60 and the second outer-link end portion 62. As seen in FIG. 3, the first link pin 22 extends through the first outer-link opening 66. The second link pin 24 extends through the second outer-link opening 68. The first outer-link end portion 60 is provided on an upstream side of the second outer-link end portion 62 in the driving direction DD.

As seen in FIGS. 22 to 26, the second outer link plate 20 comprises a third outer-link end portion 70, a fourth outer-link end portion 72, and a second outer-link intermediate portion 74. The third outer-link end portion 70 includes a third outer-link opening 76 having a third outer-link center axis CA23. The fourth outer-link end portion 72 includes a fourth outer-link opening 78 having a fourth outer-link center axis CA24. The fourth outer-link center axis CA24 is spaced apart from the third outer-link center axis CA23 in a second outer-link longitudinal direction D42. The second outer-link intermediate portion 74 interconnects the third outer-link end portion 70 and the fourth outer-link end portion 72.

As seen in FIG. 3, the third outer-link center axis CA23 extends through the first outer-link opening 66. The fourth outer-link center axis CA24 extends through the second outer-link opening 68. The third outer-link center axis CA23 is substantially coincident with the first outer-link center axis CA21. The fourth outer-link center axis CA24 is substantially coincident with the second outer-link center axis CA22. However, the third outer-link center axis CA23 can be offset from the first outer-link center axis CA21. The fourth outer-link center axis CA24 can be offset from the second outer-link center axis CA22. The third outer-link end portion 70 is provided on an upstream side of the fourth outer-link end portion 72 in the driving direction DD.

As seen in FIG. 3, the second outer link plate 20 comprises a projection 80 extending from the second outer-link intermediate portion 74 toward the first outer-link intermediate portion 64. The projection 80 extends from the fourth inner surface 20A toward the first outer-link intermediate portion 64 in the axial direction D1. The first outer-link intermediate portion 64 includes a first outer-link intermediate surface 64A facing toward the second outer-link intermediate portion 74 in the axial direction D1. The third inner surface 18A includes the first outer-link intermediate surface 64A. The second outer-link intermediate portion 74 includes a second outer-link intermediate surface 74A facing toward the first outer-link intermediate portion 64 in the axial direction D1. The fourth inner surface 20A includes the second outer-link intermediate surface 74A. The projection 80 extends from the second outer-link intermediate surface 74A toward the first outer-link intermediate surface 64A in the axial direction D1.

The projection 80 extends from the second outer-link intermediate surface 74A toward the first outer link plate 18 in the axial direction D1 by an amount of protrusion AP1. A difference between the first maximum distance MD11 and the third maximum distance MD13 is smaller than the amount of protrusion AP1 of the projection 80. However, the difference between the first maximum distance MD11 and the third maximum distance MD13 can be equal to or larger than the amount of protrusion AP1 of the projection 80.

As seen in FIG. 3, the first outer link plate 18 is free of a projection extending from the first outer-link intermediate portion 64 toward the second outer-link intermediate portion 74 in the axial direction D1. However, the first outer link plate 18 can include a projection 80 as well as the second outer link plate 20.

As seen in FIG. 3, an axial distance AD1 is defined from the first inner surface 14A of the first inner-link intermediate portion 34 to the second inner surface 16A of the second inner-link intermediate portion 44. The axial distance AD1 ranges from 2.1 mm to 2.3 mm. In this embodiment, the axial distance AD1 is 2.2 mm. However, the axial distance is not limited to this embodiment and the above range. The axial distance AD1 is a maximum axial distance between the first inner surface 14A of the first inner-link intermediate portion 34 and the second inner surface 16A of the second inner-link intermediate portion 44 in the axial direction D1.

As seen in FIG. 3, an additional axial distance AD2 is defined from the third inner surface 18A of the first outer-link intermediate portion 64 to the projection 80. The additional axial distance AD2 is a maximum axial distance between the third inner surface 18A of the first outer-link intermediate portion 64 and the projection 80 in the axial direction D1. The axial distance AD1 is smaller than the additional axial distance AD2.

The first tooth TH1 has a first axial width TH11 defined in the axial direction D1. The second tooth TH2 has a second axial width TH21 defined in the axial direction D1. The first teeth TH1 and the second teeth TH2 are alternately arranged in the driving direction DD. The first axial width TH11 is smaller than the axial distance AD1 of the inner link space SP1. The second axial width TH21 is larger than the axial distance AD1 of the inner link space SP1 and smaller than the additional axial distance AD2 of the outer link space SP2.

Figure 27:
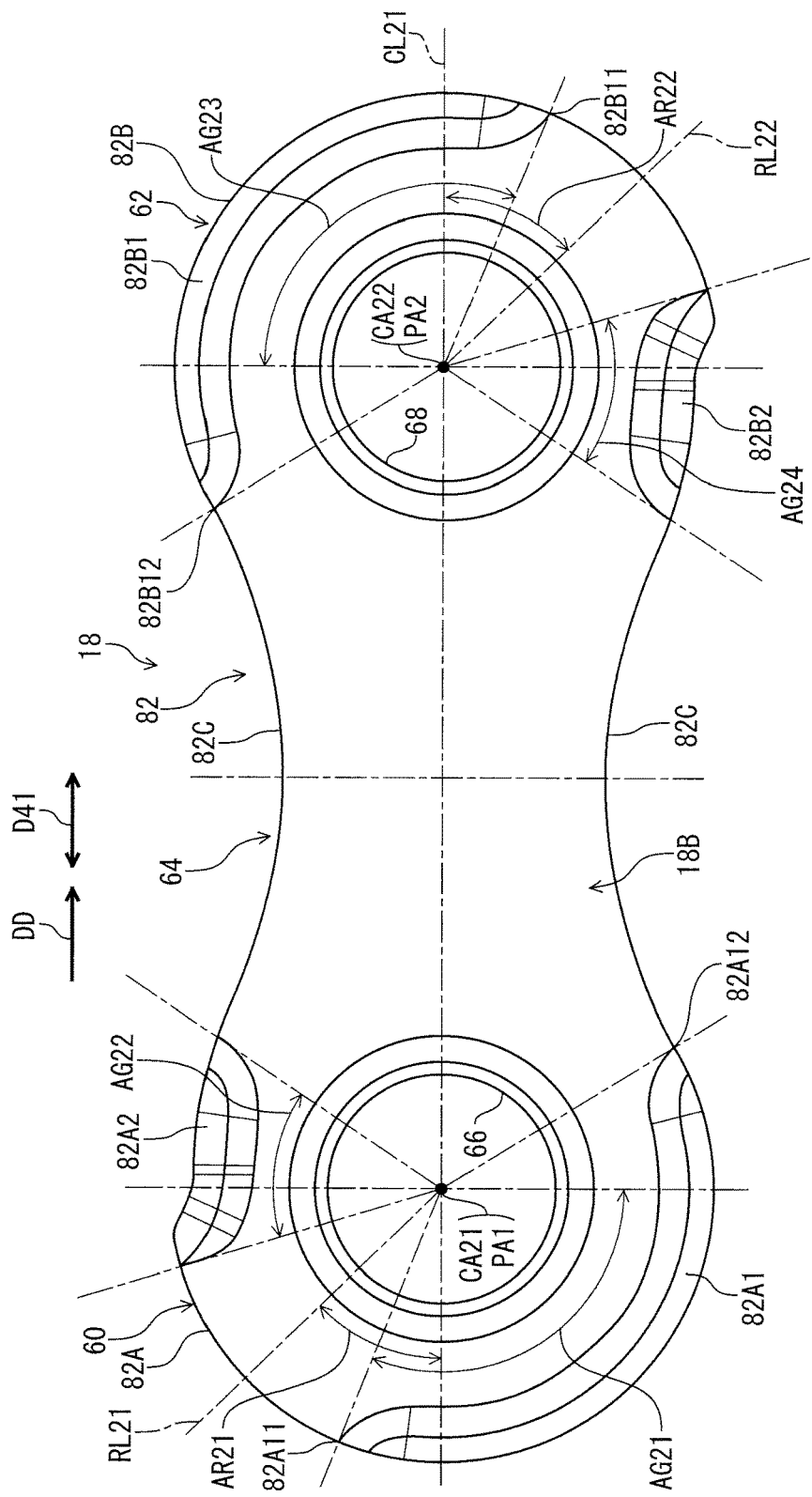
FIG. 27 is an enlarged side elevational view of the first outer link plate of the bicycle chain illustrated in FIG. 1.

As seen in FIG. 27, the first outer-link end portion 60, the second outer-link end portion 62 and the first outer-link intermediate portion 64 define a first outer-link outer peripheral edge 82. The first outer-link outer peripheral edge 82 comprises a first outer-link end edge 82A, a second outer-link end edge 82B, and a pair of first outer-link intermediate edges 82C. The first outer-link end edge 82A extends about the first outer-link end portion 60. The second outer-link end edge 82B extends about the second outer-link end portion 62. The pair of first outer-link intermediate edges 82C extends along the first outer-link intermediate portion 64 between the first outer-link end edge 82A and the second outer-link end edge 82B.

The first outer link plate 18 comprises a first outer-link longitudinal centerline CL21 perpendicular to the first outer-link center axis CA21 and the second outer-link center axis CA22 The first outer-link end edge 82A has a first chamfer 82A1 extending about the first outer-link center axis CA21 such that a part of the first chamfer 82A1 disposed in a circumferential area AR21 defined from the first outer-link longitudinal centerline CL21 to a first reference line RL21 extending radially outwardly from first outer-link center axis CA21 when viewed in the axial direction D1 of the first outer-link center axis CA21. The circumferential area AR21 is smaller than 90 degrees. In this embodiment, the circumferential area AR21 is equal to or smaller than 45 degrees. The circumferential area AR21 is larger than 0 degrees. However, the circumferential area AR21 is not limited to this embodiment.

The first outer-link end edge 82A has a first additional chamfer 82A2. The first additional chamfer 82A2 is a separate chamfer from the first chamfer 82A1. The first chamfer 82A1 includes a first circumferential end 82A11 and a first additional circumferential end 82A12. The first chamfer 82A1 extends from the first circumferential end 82A11 to the first additional circumferential end 82A12 beyond the first outer-link longitudinal centerline CL21. The first outer-link longitudinal centerline CL21 is provided between the first circumferential end 82A11 and the first additional circumferential end 82A12 when viewed in the axial direction D1.

The first chamfer 82A1 has a first circumferential angle AG21 defined between the first circumferential end 82A11 and the first additional circumferential end 82A12 about the first outer-link center axis CA21. The first additional chamfer 82A2 has a first additional circumferential angle AG22 defined between opposite ends of the first additional chamfer 82A2 about the first outer-link center axis CA21. The first circumferential angle AG21 is larger than the first additional circumferential angle AG22. However, the first circumferential angle AG21 can be equal to or smaller than the first additional circumferential angle AG22. Both of the first chamfer 82A1 and the first additional chamfer 82A2 are disposed on the third outer surface 18B. At least one of the first chamfer 82A1 and the first additional chamfer 82A2 can be omitted from the first outer-link end edge 82A.

The second outer-link end edge 82B has a second chamfer 82B1 extending about the second outer-link center axis CA22 such that a part of the second chamfer 82B1 disposed in a circumferential area AR22 defined from the first outer-link longitudinal centerline CL21 to a second reference line RL22 extending radially outwardly from second outer-link center axis CA22 when viewed in the axial direction D1. The circumferential area AR22 is smaller than 90 degrees. In this embodiment, the circumferential area AR22 is equal to or smaller than 45 degrees. The circumferential area AR22 is larger than 0 degrees. However, the circumferential area AR22 is not limited to this embodiment.

The second outer-link end edge 82B has a second additional chamfer 82B2. The second additional chamfer 82B2 is a separate chamfer from the second chamfer 82B1. The second chamfer 82B1 includes a second circumferential end 82B11 and a second additional circumferential end 82B12. The second chamfer 82B1 extends from the second circumferential end 82B11 to the second additional circumferential end 82B12 beyond the first outer-link longitudinal centerline CL21. The first outer-link longitudinal centerline CL21 is provided between the second circumferential end 82B11 and the second additional circumferential end 82B12 when viewed in the axial direction D1.

The second chamfer 82B1 has a second circumferential angle AG23 defined between the second circumferential end 82B11 and the second additional circumferential end 82B12 about the second outer-link center axis CA22. The second additional chamfer 82B2 has a second additional circumferential angle AG24 defined between opposite ends of the second additional chamfer 82B2 about the second outer-link center axis CA22. Both of the second chamfer 82B1 and the second additional chamfer 82B2 are disposed on the third outer surface 18B. At least one of the second chamfer 82B1 and the second additional chamfer 82B2 can be omitted from the second outer-link end edge 82B.

Figure 28:
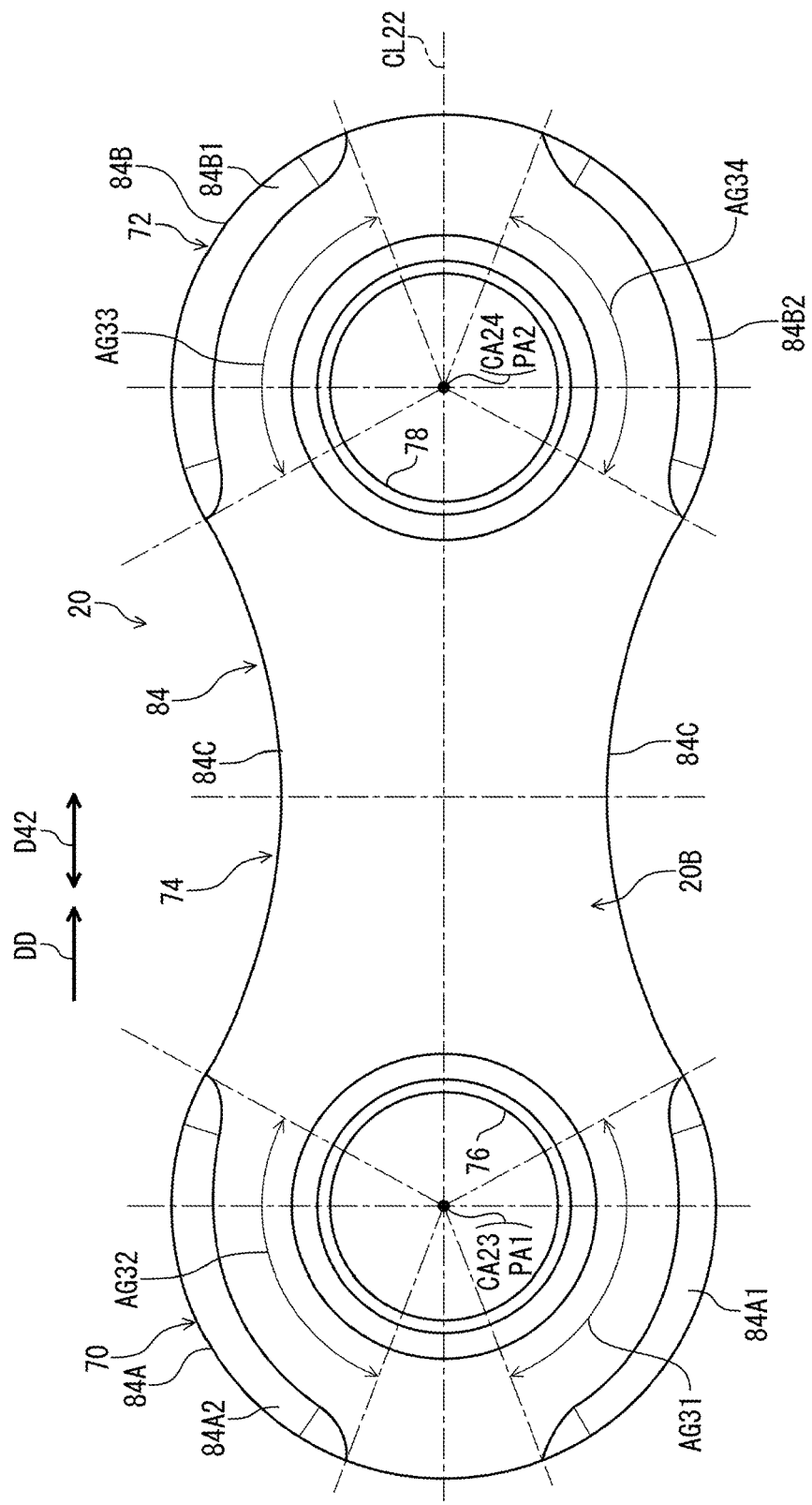
FIG. 28 is an enlarged side elevational view of the second outer link plate of the bicycle chain illustrated in FIG. 1.

As seen in FIG. 28, the third outer-link end portion 70, the fourth outer-link end portion 72 and the second outer-link intermediate portion 74 define a second outer-link outer peripheral edge 84. The second outer-link outer peripheral edge 84 comprises a third outer-link end edge 84A, a fourth outer-link end edge 84B, and a pair of second outer-link intermediate edges 84C. The third outer-link end edge 84A extends about the third outer-link end portion 70. The fourth outer-link end edge 84B extends about the fourth outer-link end portion 72. The pair of second outer-link intermediate edges 84C extends along the second outer-link intermediate portion 74 between the third outer-link end edge 84A and the fourth outer-link end edge 84B.

The second outer link plate 20 comprises a second outer-link longitudinal centerline CL22 perpendicular to the third outer-link center axis CA23 and the fourth outer-link center axis CA24. The third outer-link end edge 84A has a third chamfer 84A1 extending about the third outer-link center axis CA23. The third outer-link end edge 84A has a third additional chamfer 84A2. The third additional chamfer 84A2 is a separate chamfer from the third chamfer 84A1. The third chamfer 84A1 has a third circumferential angle AG31 defined between opposite ends of the third chamfer 84A1 about the third outer-link center axis CA23. The third additional chamfer 84A2 has a third additional circumferential angle AG32 defined between opposite ends of the third additional chamfer 84A2 about the third outer-link center axis CA23. The third circumferential angle AG31 is larger than the third additional circumferential angle AG32. However, the third circumferential angle AG31 can be equal to or smaller than the third additional circumferential angle AG32. Both of the third chamfer 84A1 and the third additional chamfer 84A2 are disposed on the fourth outer surface 20B. At least one of the third chamfer 84A1 and the third additional chamfer 84A2 can be omitted from the third outer-link end edge 84A.

The fourth outer-link end edge 84B has a fourth chamfer 84B1 extending about the fourth outer-link center axis CA24. The fourth outer-link end edge 84B has a fourth additional chamfer 84B2. The fourth additional chamfer 84B2 is a separate chamfer from the fourth chamfer 84B1. The fourth chamfer 84B1 has a fourth circumferential angle AG33 defined between opposite ends of the fourth chamfer 84B1 about the fourth outer-link center axis CA24. The fourth additional chamfer 84B2 has a fourth additional circumferential angle AG34 defined between opposite ends of the fourth additional chamfer 84B2 about the fourth outer-link center axis CA24. The fourth circumferential angle AG33 is larger than the fourth additional circumferential angle AG34. However, the fourth circumferential angle AG33 can be equal to or smaller than the fourth additional circumferential angle AG34. Both of the fourth chamfer 84B1 and the fourth additional chamfer 84B2 are disposed on the fourth outer surface 20B. At least one of the fourth chamfer 84B1 and the fourth additional chamfer 84B2 can be omitted from the fourth outer-link end edge 84B.

As seen in FIGS. 27 and 28, the first circumferential angle AG21 is larger than each of the third circumferential angle AG31, the third additional circumferential angle AG32, the fourth circumferential angle AG33, and the fourth additional circumferential angle AG34. The second circumferential angle AG23 is larger than each of the third circumferential angle AG31, the third additional circumferential angle AG32, the fourth circumferential angle AG33, and the fourth additional circumferential angle AG34. However, the first circumferential angle AG21 can be equal to or smaller than at least one of the third circumferential angle AG31, the third additional circumferential angle AG32, the fourth circumferential angle AG33, and the fourth additional circumferential angle AG34. The second circumferential angle AG23 can be equal to or smaller than at least one of the third circumferential angle AG31, the third additional circumferential angle AG32, the fourth circumferential angle AG33, and the fourth additional circumferential angle AG34.

Figure 29:
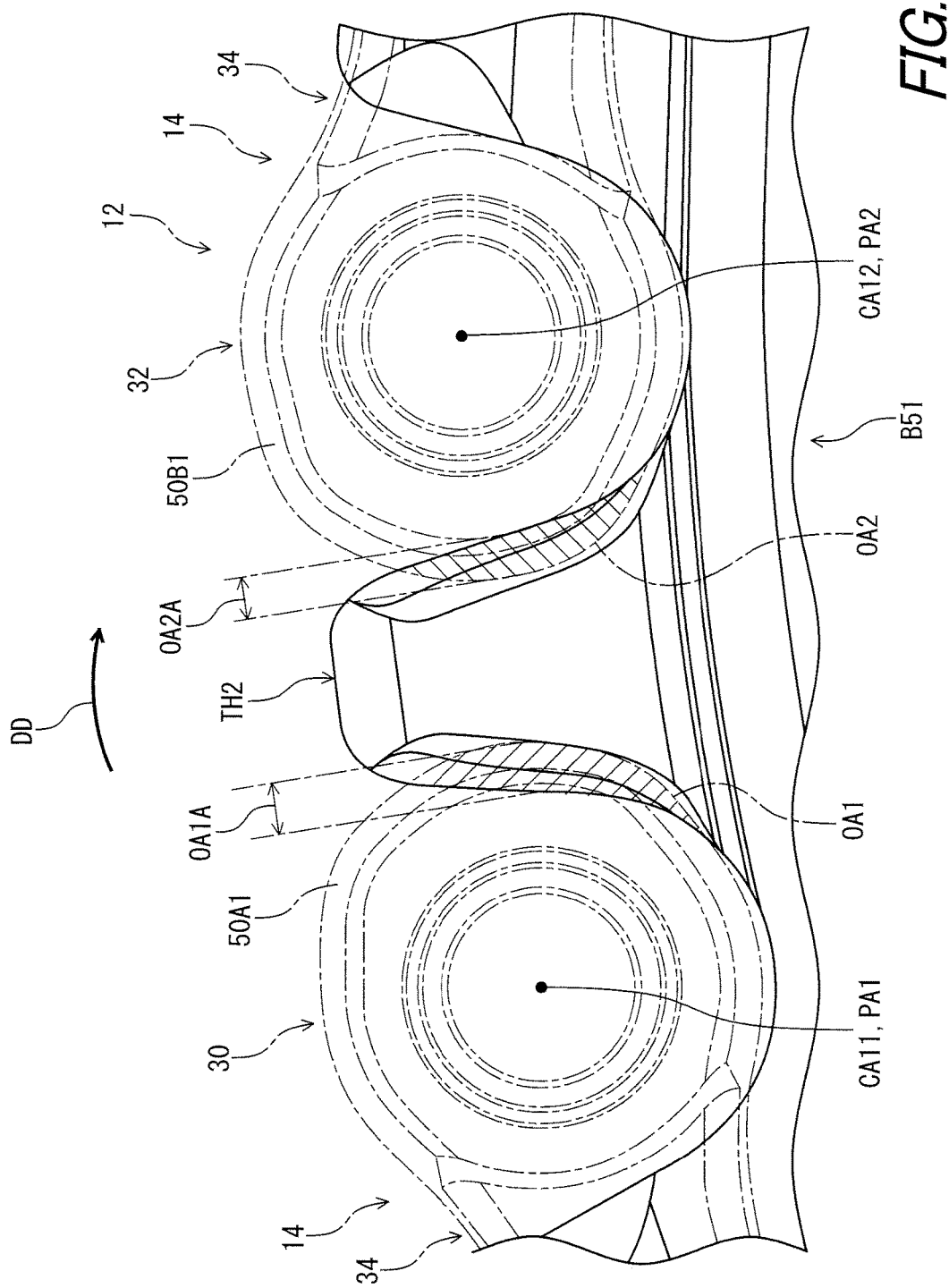
FIG. 29 is a side elevational view of the first inner link plates of the bicycle chain illustrated in FIG. 1, with a sprocket.

As seen in FIG. 29, the first inner-link end portion 30 overlaps with the second tooth TH2 of the front sprocket B51 when viewed in the axial direction D1 to provide an overlapping area OA1 in a state where the bicycle chain 12 is engaged with the front sprocket B51. The overlapping area OA1 has a maximum circumferential length OA1A equal to or larger than 0.45 mm. The maximum circumferential length OA1A is equal to or smaller than 3 mm.

The second inner-link end portion 32 overlaps with the tooth TH1 of the sprocket (e.g., the front sprocket B51) when viewed in the axial direction D1 to provide an overlapping area OA2 in a state where the bicycle chain 12 is engaged with the sprocket (e.g., the front sprocket B51). The overlapping area OA2 has a maximum circumferential length OA2A equal to or larger than 0.45 mm. The maximum circumferential length OA2A is equal to or smaller than 3 mm.

The maximum circumferential length OA1A of the first inner-link end portion 30 is substantially equal to the maximum circumferential length OA2A of the second inner-link end portion 32. However, the maximum circumferential length OA1A of the first inner-link end portion 30 can be different from the maximum circumferential length OA2A of the second inner-link end portion 32.

Second Embodiment

A bicycle chain 212 in accordance with a second embodiment will be described below referring to FIGS. 30 to 44. The bicycle chain 212 has the same structure as that of the bicycle chain 12 except for the first inner link plate 14, the second inner link plate 16, the first outer link plate 18, and the second outer link plate 20. Thus, elements having substantially the same function as those in the first embodiment will be numbered the same here, and will not be described and/or illustrated again in detail here for the sake of brevity.

Figure 30:
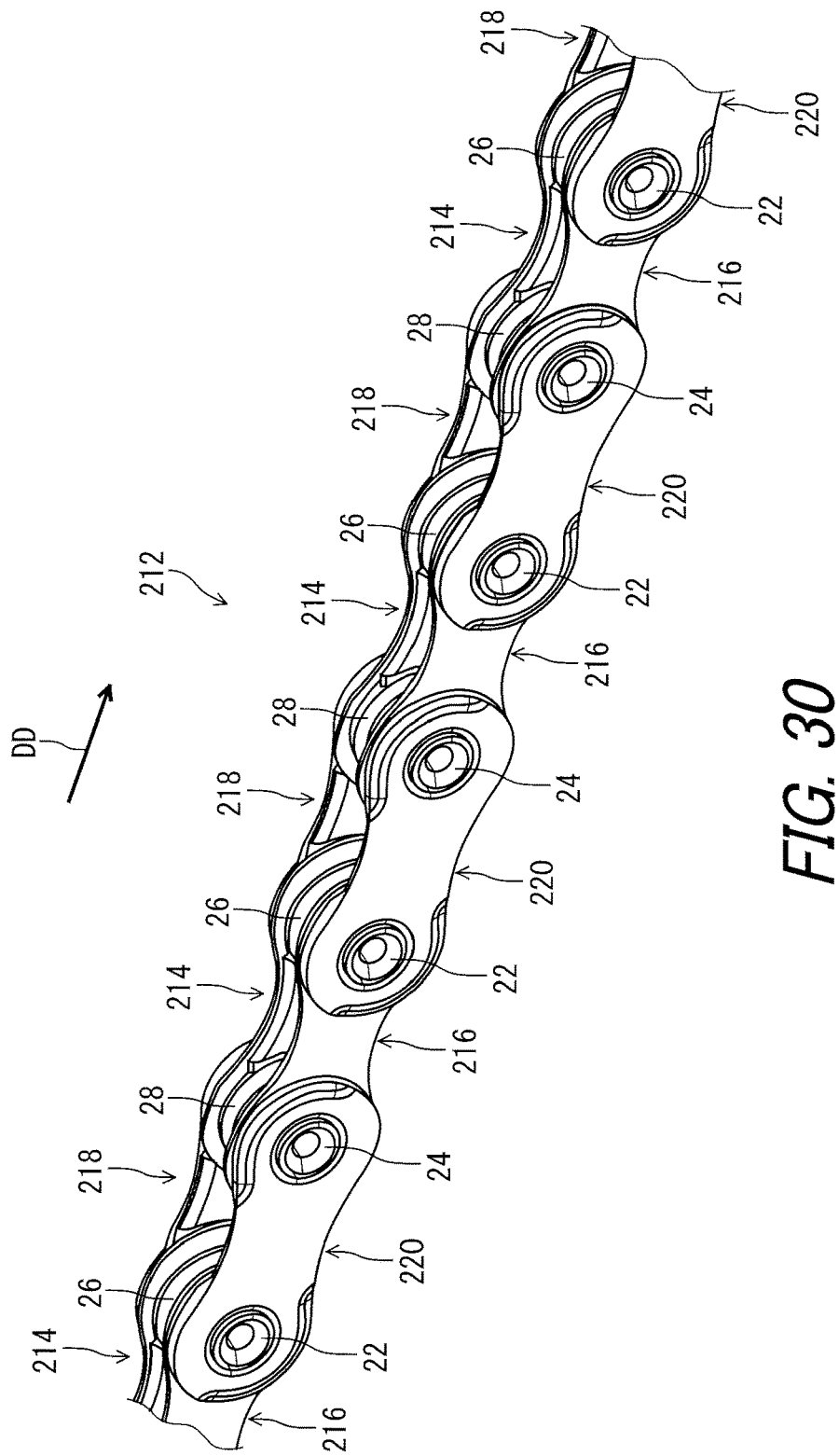
FIG. 30 is a partial perspective view of a bicycle chain in accordance with a second embodiment.
Figure 31:
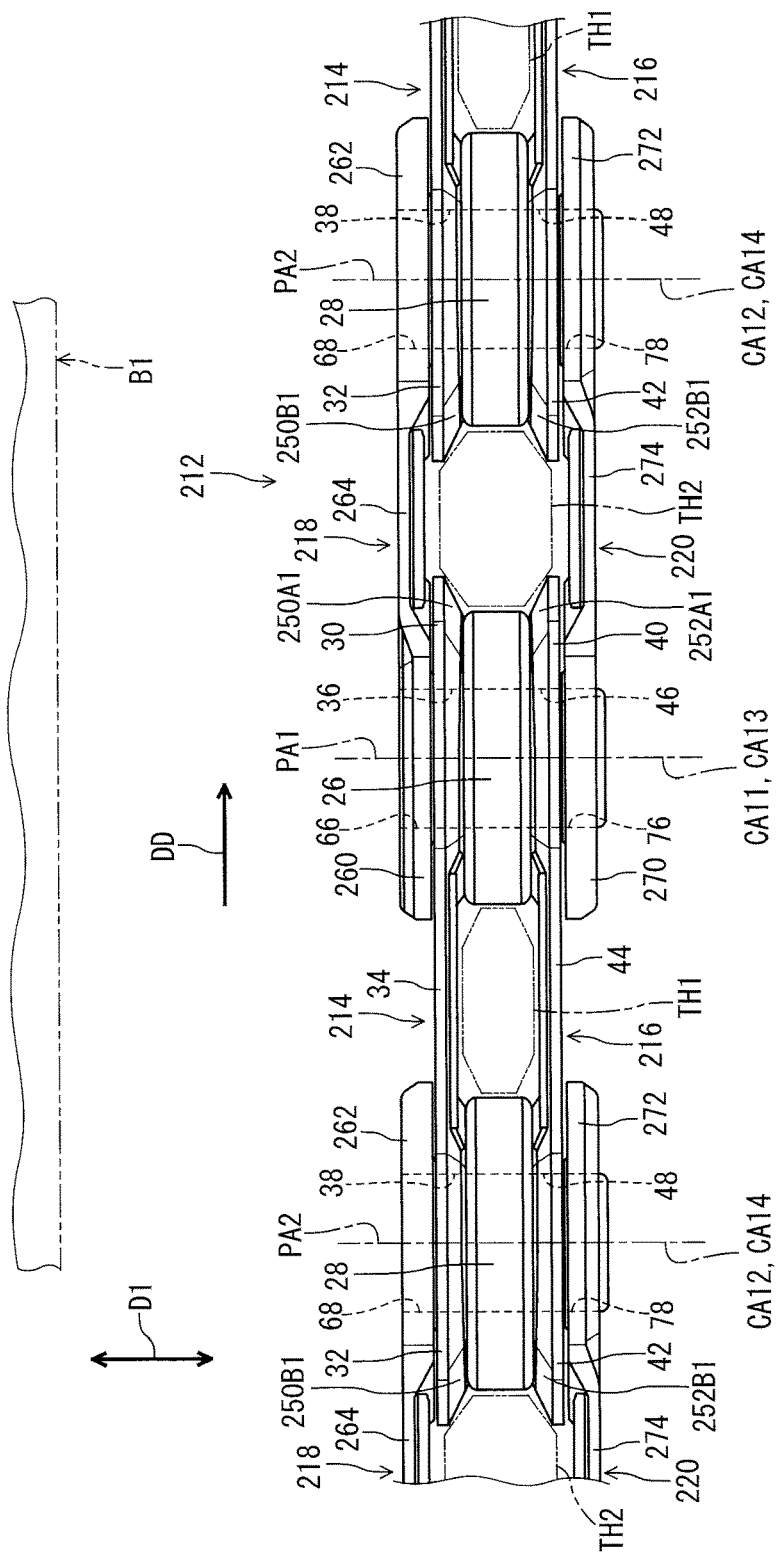
FIG. 31 is a partial plan view of the bicycle chain illustrated in FIG. 30.

As seen in FIGS. 30 and 31, the bicycle chain 212 comprises a first inner link plate 214, a second inner link plate 216, a first outer link plate 218, and a second outer link plate 220. In this embodiment, the bicycle chain 212 comprises a plurality of first inner link plates 214, a plurality of second inner link plates 216, a plurality of first outer link plates 218, and a plurality of second outer link plates 220. However, a total number of the first inner link plates 214, a total number of the second inner link plates 216, a total number of the first outer link plates 218, and a total number of the second outer link plates 220 are not limited to this embodiment.

Figure 32:
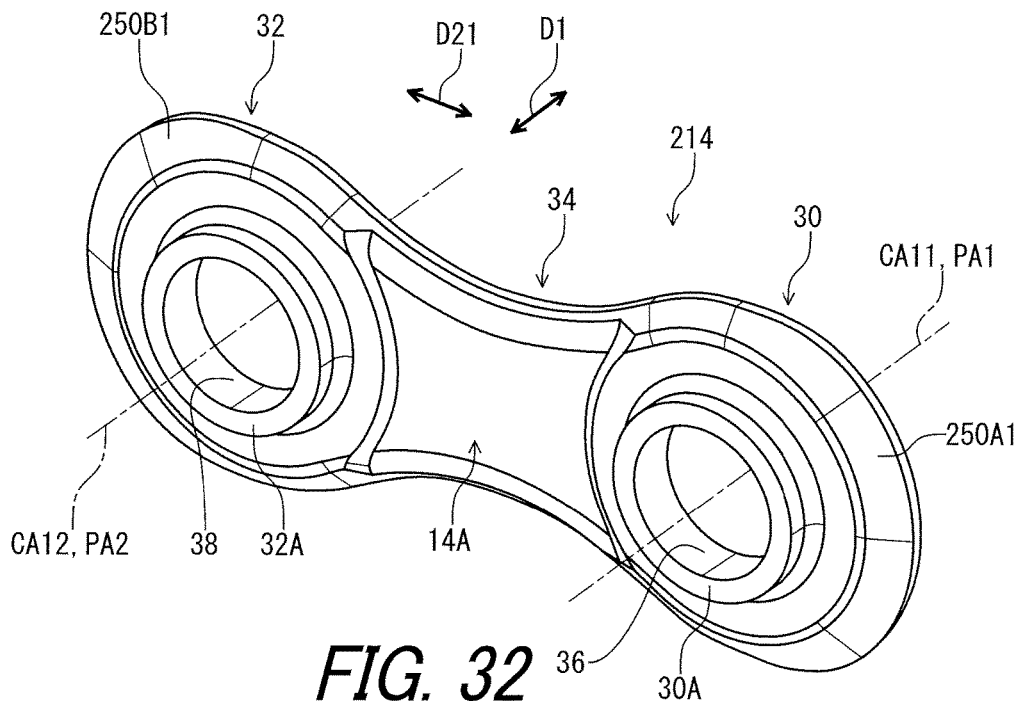
FIG. 32 is a perspective view of a first inner link plate of the bicycle chain illustrated in FIG. 31.
Figure 33:
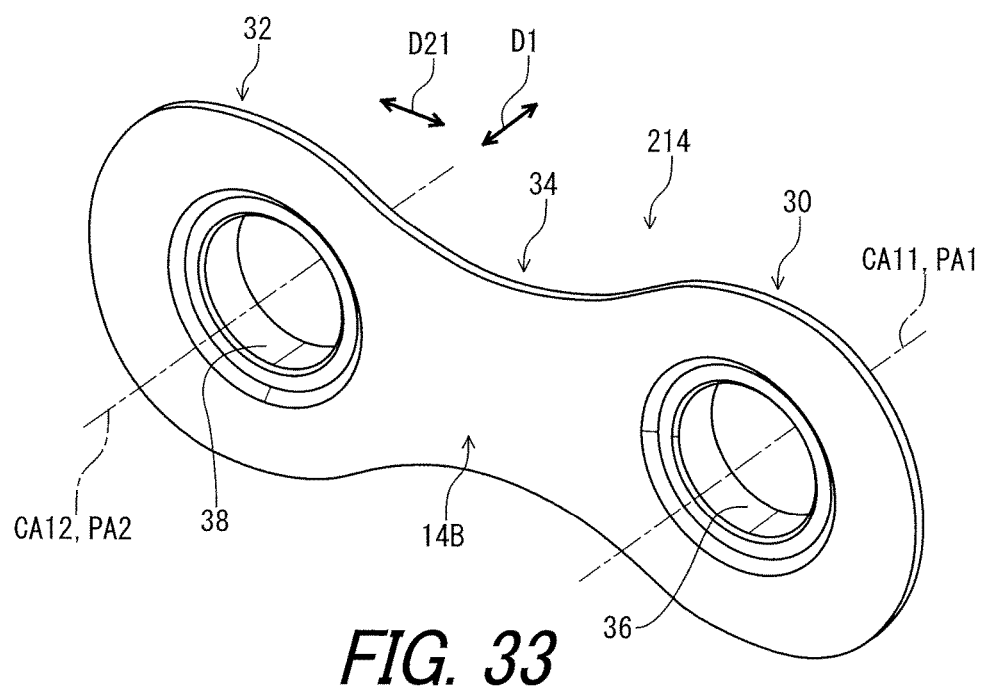
FIG. 33 is another perspective view of the first inner link plate of the bicycle chain illustrated in FIG. 31.
Figure 34:
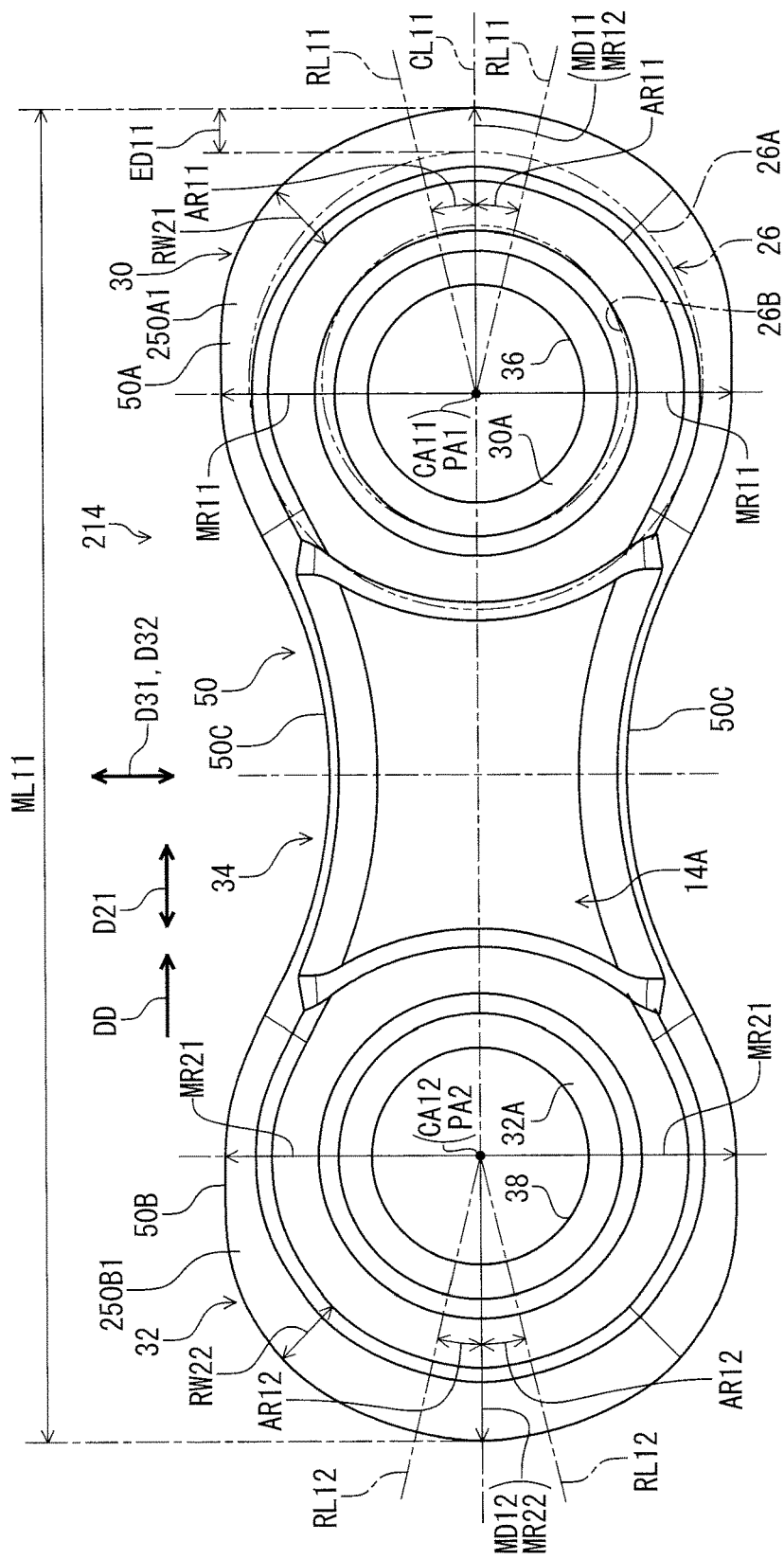
FIG. 34 is an enlarged side elevational view of the first inner link plate of the bicycle chain illustrated in FIG. 31.

As seen in FIGS. 32 and 33, the first inner link plate 214 has substantially the same structure as that of the first inner link plate 14 of the first embodiment. As seen in FIG. 34, the first inner-link end edge 50A has a first chamfer 250A1 extending about the first inner-link center axis CA11 such that a part of the first chamfer 250A1 is disposed in the first circumferential area AR11. The first chamfer 250A1 has a first radial width RW21 defined in a radial direction with respect to the first inner-link center axis CA11. The first radial width RW21 increases from one of the pair of first inner-link intermediate edges 50C toward the first inner-link longitudinal centerline CL11 when viewed in the axial direction D1.

Figure 35:
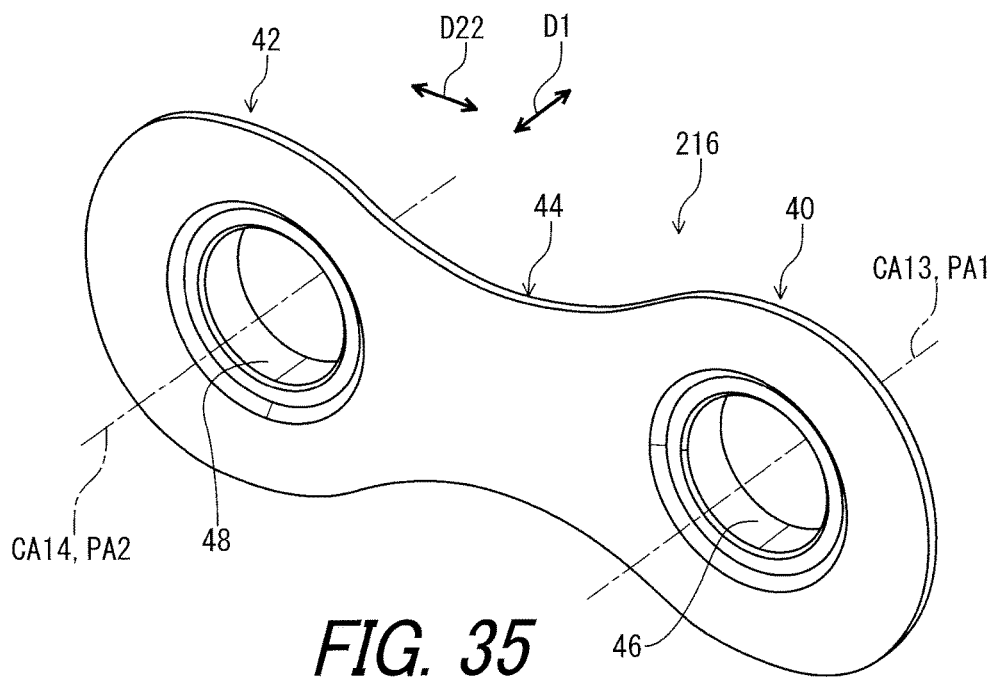
FIG. 35 is a perspective view of a second inner link plate of the bicycle chain illustrated in FIG. 31.
Figure 36:
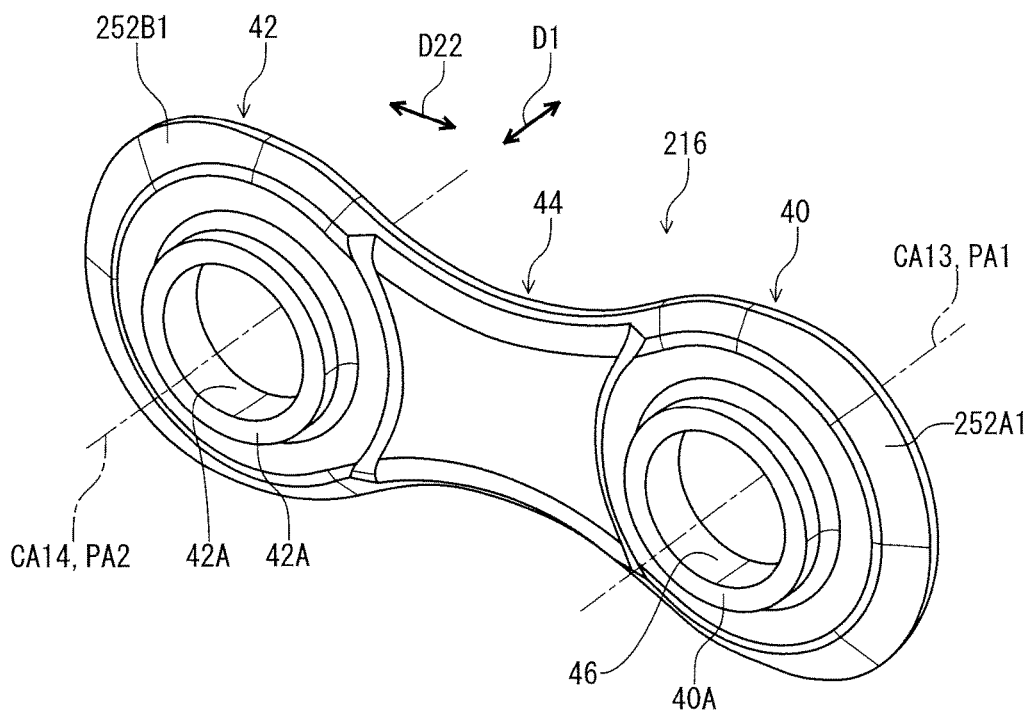
FIG. 36 is another perspective view of the second inner link plate of the bicycle chain illustrated in FIG. 31.

As seen in FIGS. 35 and 36, the second inner link plate 216 has substantially the same structure as that of the first inner link plate 214. As seen in FIG. 32, the second inner-link end edge 50B has a second chamfer 250B1 extending about the first inner-link center axis CA11 such that a part of the second chamfer 250B1 is disposed in the first circumferential area AR11. The second chamfer 250B1 has a second radial width RW22 defined in a radial direction with respect to the second inner-link center axis CA12. The second chamfer 250B1 increases from one of the pair of first inner-link intermediate edges 50C toward the first inner-link longitudinal centerline CL11 when viewed in the axial direction D1.

Figure 37:
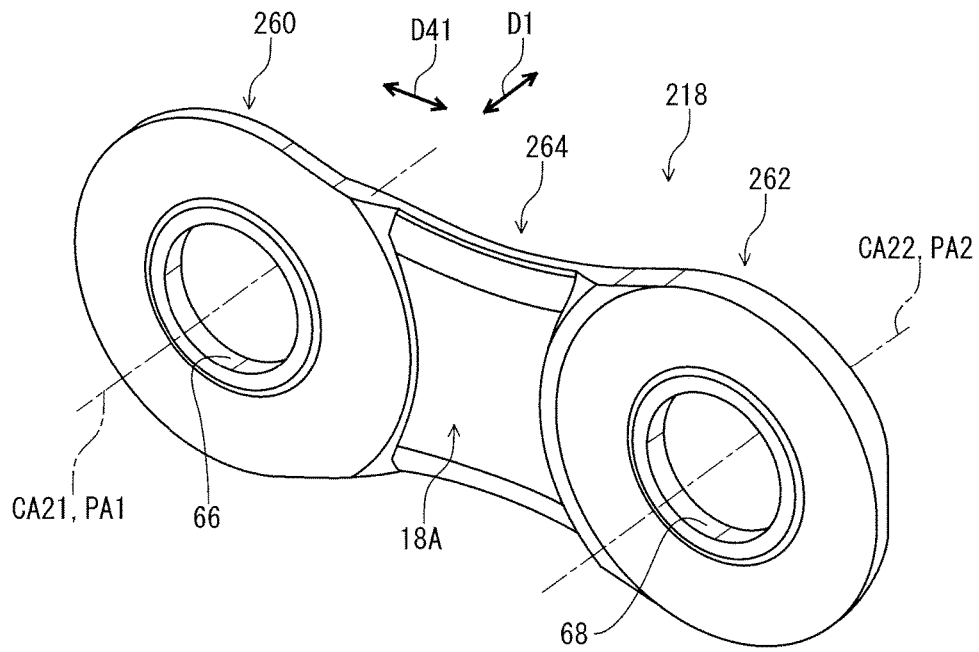
FIG. 37 is a perspective view of a first outer link plate of the bicycle chain illustrated in FIG. 31.
Figure 38:
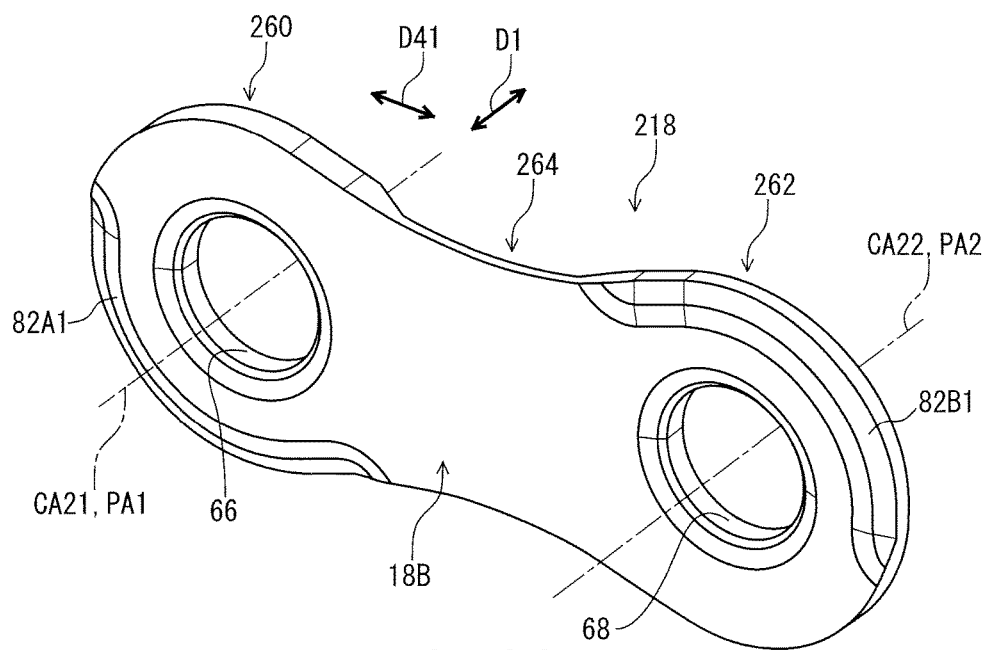
FIG. 38 is another perspective view of the first outer link plate of the bicycle chain illustrated in FIG. 31.

As seen in FIGS. 37 and 38, the first outer link plate 218 has substantially the same structure as that of the first outer link plate 18 of the first embodiment. The first outer link plate 218 is free of the projection 80 of the first embodiment. The first outer link plate 218 comprises a first outer-link end portion 260, a second outer-link end portion 262, and a first outer-link intermediate portion 264. The first outer-link end portion 260 has substantially the same structure as that of the first outer-link end portion 60 of the first embodiment. The second outer-link end portion 262 has substantially the same structure as that of the second outer-link end portion 62 of the first embodiment. The first outer-link intermediate portion 264 has substantially the same structure as that of the first outer-link intermediate portion 64 of the first embodiment.

Figure 39:
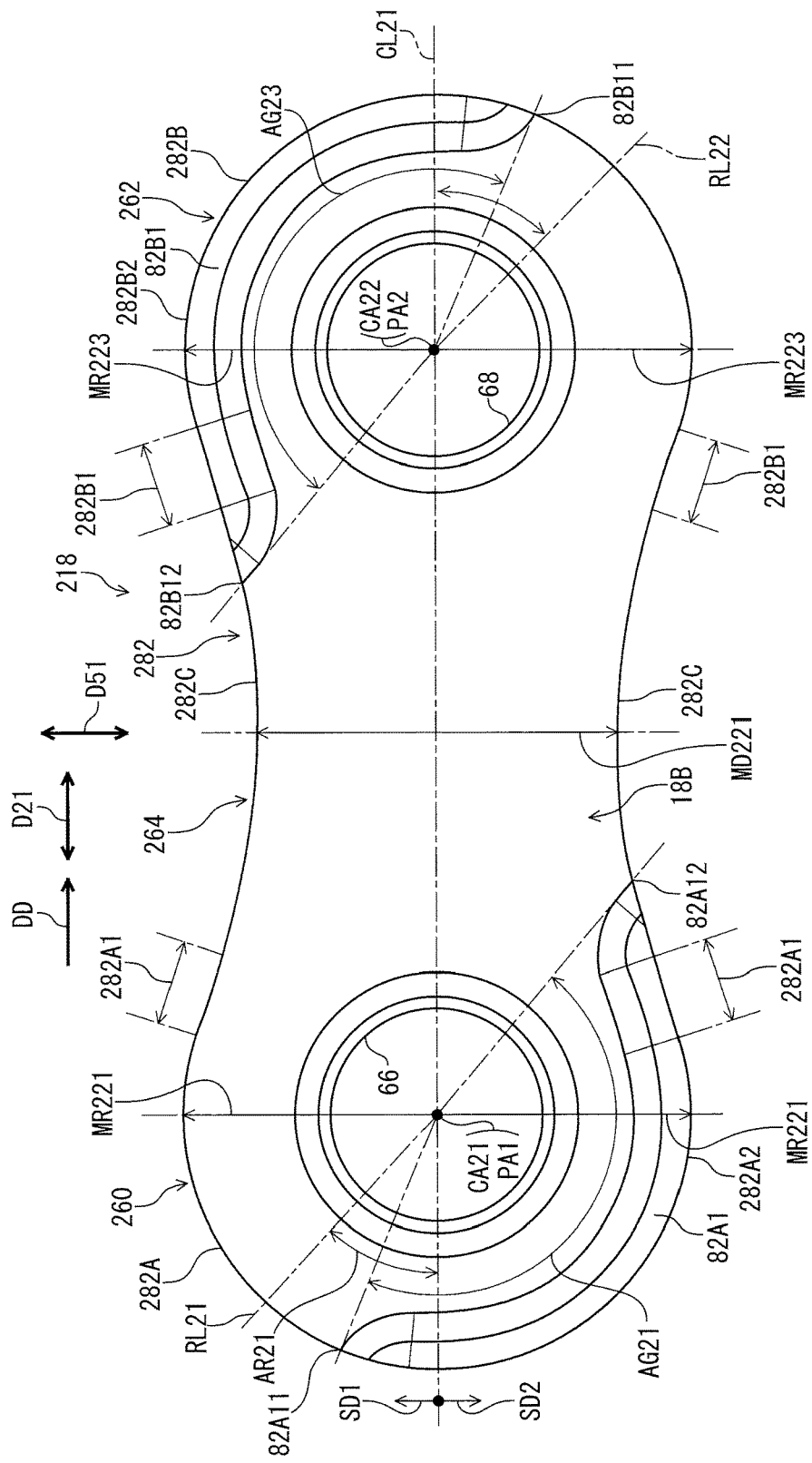
FIG. 39 is an enlarged side elevational view of the first outer link plate of the bicycle chain illustrated in FIG. 31.

As seen in FIG. 39, the first outer-link end portion 260, the second outer-link end portion 262 and the first outer-link intermediate portion 264 define a first outer-link outer peripheral edge 282. The first outer-link outer peripheral edge 282 comprises a first outer-link end edge 282A, a second outer-link end edge 282B, and the pair of first outer-link intermediate edges 282C. The first outer-link end edge 282A extends about the first outer-link end portion 260. The second outer-link end edge 282B extends about the second outer-link end portion 262. The pair of first outer-link intermediate edges 282C extends along the first outer-link intermediate portion 264 between the first outer-link end edge 282A and the second outer-link end edge 282B.

At least one of the first outer-link end edge 282A, the second outer-link end edge 282B, and the pair of first outer-link intermediate edges 282C has a chamfer. In this embodiment, the first outer-link end edge 282A has the first chamfer 82A1 extending about the first outer-link center axis CA21 such that a part of the first chamfer 82A1 disposed in the circumferential area AR21 defined from the first outer-link longitudinal centerline CL21 to the first reference line RL21 when viewed in the axial direction D1 of the first outer-link center axis CA21. In this embodiment, the first additional chamfer 82A2 is omitted from the first outer-link end edge 282A.

The second outer-link end edge 282B has the second chamfer 82B1 extending about the second outer-link center axis CA22 such that a part of the second chamfer 82B1 disposed in the circumferential area AR22 defined from the first outer-link longitudinal centerline CL21 to the second reference line RL22 when viewed in the axial direction D1. In this embodiment, the second additional chamfer 82B2 is omitted from the second outer-link end edge 282B.

As seen in FIG. 39, a first radial distance MR221 is defined from the first outer-link center axis CA21 to the first outer-link end edge 282A in a perpendicular direction D51 perpendicular to the first outer-link longitudinal centerline CL21 when viewed in the axial direction D1 parallel to the first outer-link center axis CA21. A minimum distance MD221 is defined between the pair of first outer-link intermediate edges 282C in the perpendicular direction D51. The minimum distance MD221 is smaller than 200% of the first radial distance MR221. The minimum distance MD221 is equal to or larger than 5 mm. The minimum distance MD221 is equal to or smaller than 8 mm. The minimum distance MD221 is equal to or larger than 121% of the first radial distance MR221. The minimum distance MD221 is equal to or smaller than 190% of the first radial distance MR221. In this embodiment, the minimum distance MD221 is 142% of the first radial distance MR221. However, the minimum distance MD221 is not limited to this embodiment and the above ranges.

A first additional radial distance MR223 is defined from the second outer-link center axis CA22 to the second outer-link end edge 282B in the perpendicular direction D51 when viewed in the axial direction D1. The minimum distance MD221 is smaller than 200% of the first additional radial distance MR223. The minimum distance MD221 is equal to or larger than 121% of the first additional radial distance MR223. The minimum distance MD221 is equal to or smaller than 190% of the first additional radial distance MR223. In this embodiment, the minimum distance MD221 is 142% of the first additional radial distance MR223. However, the minimum distance MD221 is not limited to the above ranges.

Figure 40:
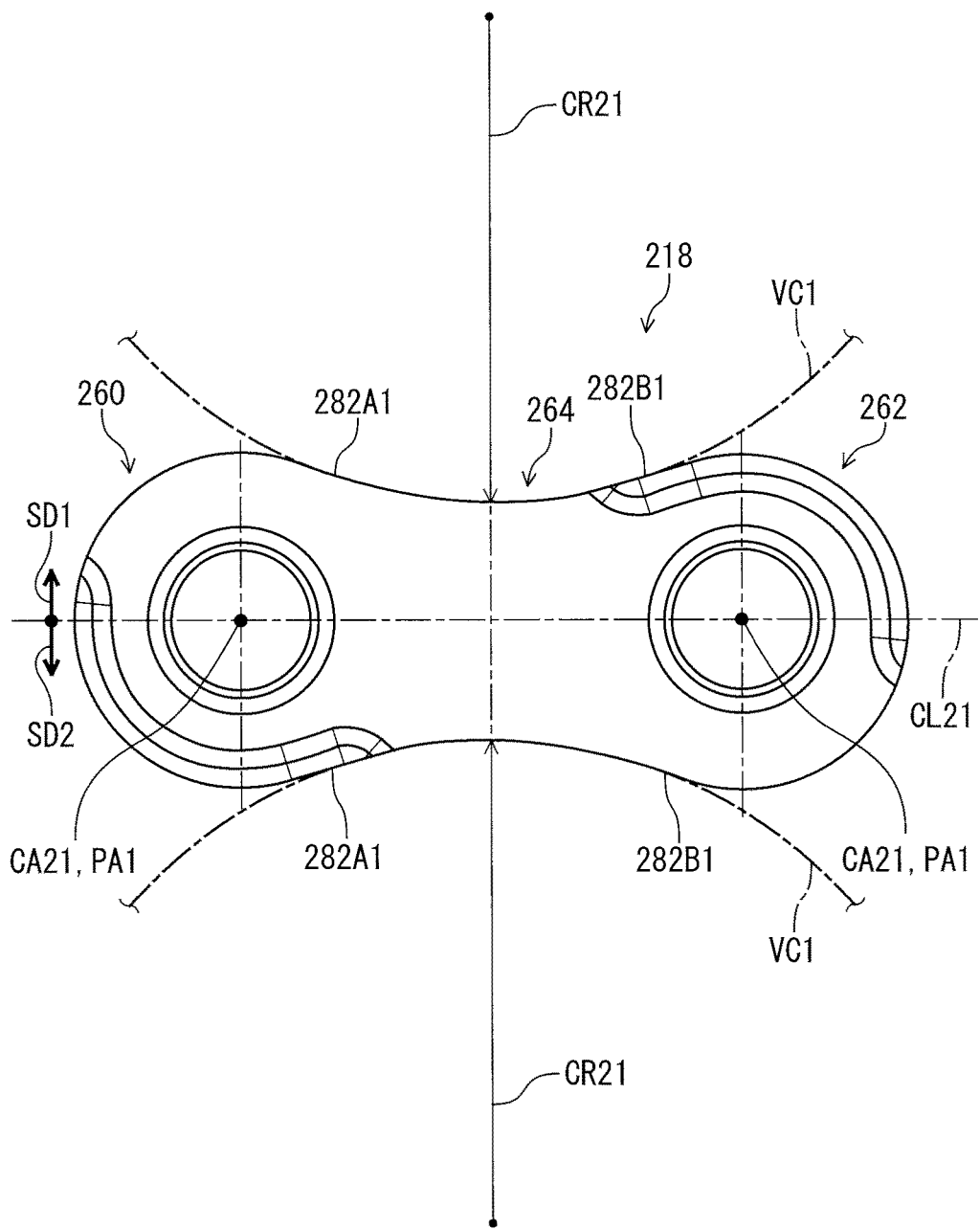
FIG. 40 is a side elevational view of the first outer link plate of the bicycle chain illustrated in FIG. 31.

As seen in FIG. 40, the at least one of the pair of first outer-link intermediate edges 282C has a curvature radius CR21 equal to or larger than 8.2 mm. The curvature radius CR21 is equal to or smaller than 12 mm. In this embodiment, the curvature radius CR21 is 11.8 mm. However, the curvature radius CR21 is not limited to this embodiment and the above ranges.

As seen in FIG. 39, the first outer-link end edge 282A includes at least one first outer-link straight edge portion 282A1 and at least one first outer-link curved edge portion 282A2. The second outer-link end edge 282B includes at least one second outer-link straight edge portion 282B1 and at least one second outer-link curved edge portion 282B2.

As seen in FIG. 40, the at least one first outer-link straight edge portion 282A1 and the at least one second outer-link straight edge portion 282B1 are tangent to a virtual circle VC1 having a radius equal to the curvature radius CR21 of the at least one of the pair of first outer-link intermediate edges 282C when viewed in the axial direction D1. The first outer-link longitudinal centerline CL21 bisects the first outer link plate 218 into a first side SD1 and a second side SD2 opposite to the first side SD1 with respect to the first outer-link longitudinal centerline CL21. The at least one first outer-link straight edge portion 282A1 of the first side SD1 and the at least one second outer-link straight edge portion 282B1 of the first side SD1 are tangent to the virtual circle VC1 having the radius equal to the curvature radius CR21 of the at least one of the pair of first outer-link intermediate edges 282C of the first side SD1 when viewed in the axial direction D1.

Figure 41:
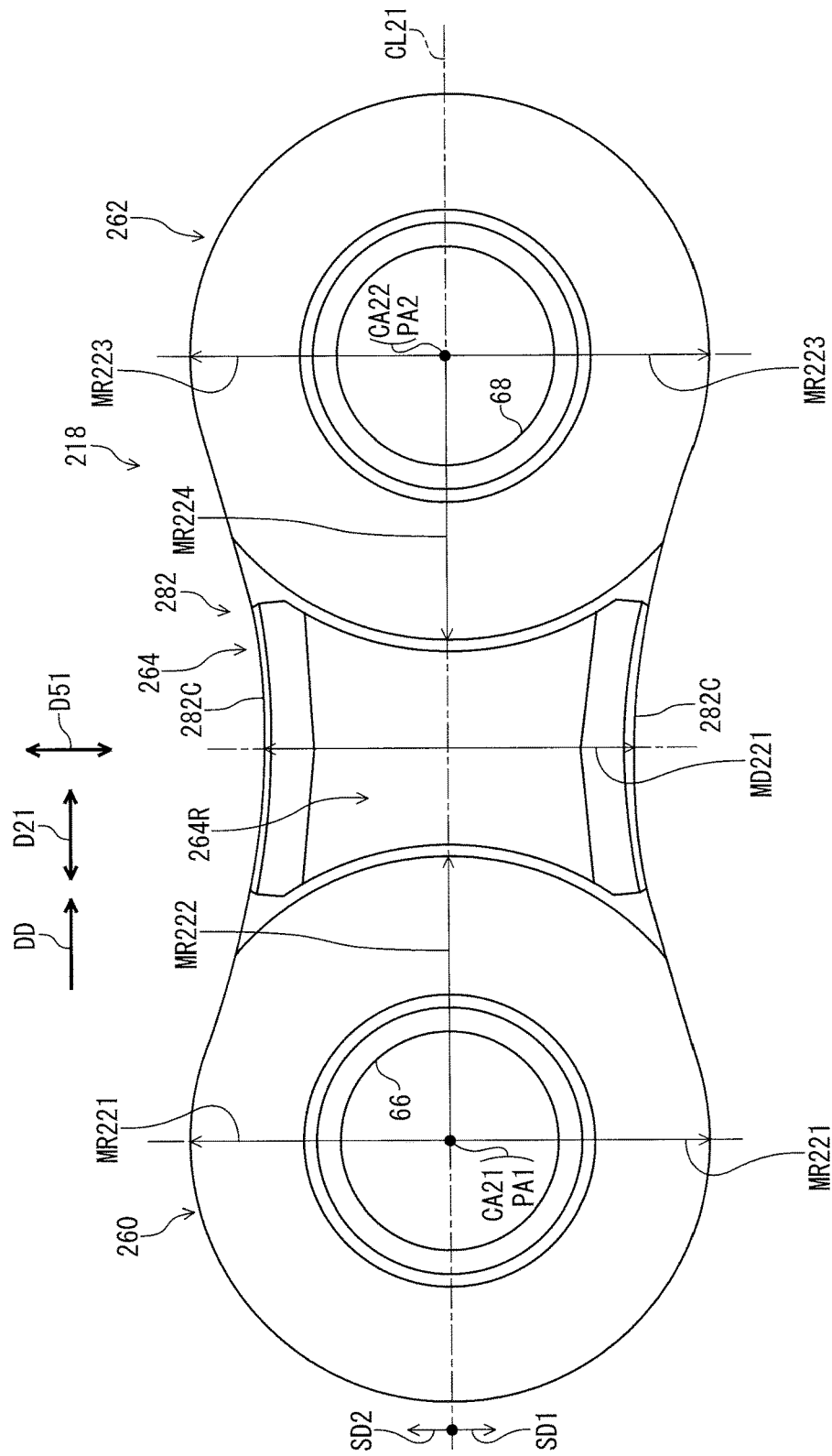
FIG. 41 is another enlarged side elevational view of the first outer link plate of the bicycle chain illustrated in FIG. 31.

As seen in FIG. 41, a first outer-link intermediate portion 264 has a recess 264R. The recess 264R is provided on the third inner surface 18A. A second radial distance MR222 is defined between the first outer-link center axis CA21 and a boundary of the recess 264R when viewed in the axial direction D1 parallel to the first outer-link center axis CA21. The second radial distance MR222 is larger than the first radial distance MR221. The second radial distance MR222 is larger than 4.2 mm. The second radial distance MR222 is equal to or smaller than 4.75 mm. In this embodiment, the second radial distance MR222 is 4.71 mm. However, the second radial distance MR222 can be equal to or smaller than the first radial distance MR221. The second radial distance MR222 is not limited to this embodiment and the above ranges.

A second additional radial distance MR224 is defined between the second outer-link center axis CA22 and the boundary of the recess 264R when viewed in the axial direction D1. The second additional radial distance MR224 is larger than the first additional radial distance MR223. The second additional radial distance MR224 is larger than 4.2 mm. The second additional radial distance MR224 is equal to or smaller than 4.75 mm. In this embodiment, the second additional radial distance MR224 is 4.71 mm. However, the second additional radial distance MR224 can be equal to or smaller than the first additional radial distance MR223. The second additional radial distance MR224 is not limited to this embodiment and the above ranges.

Figure 42:
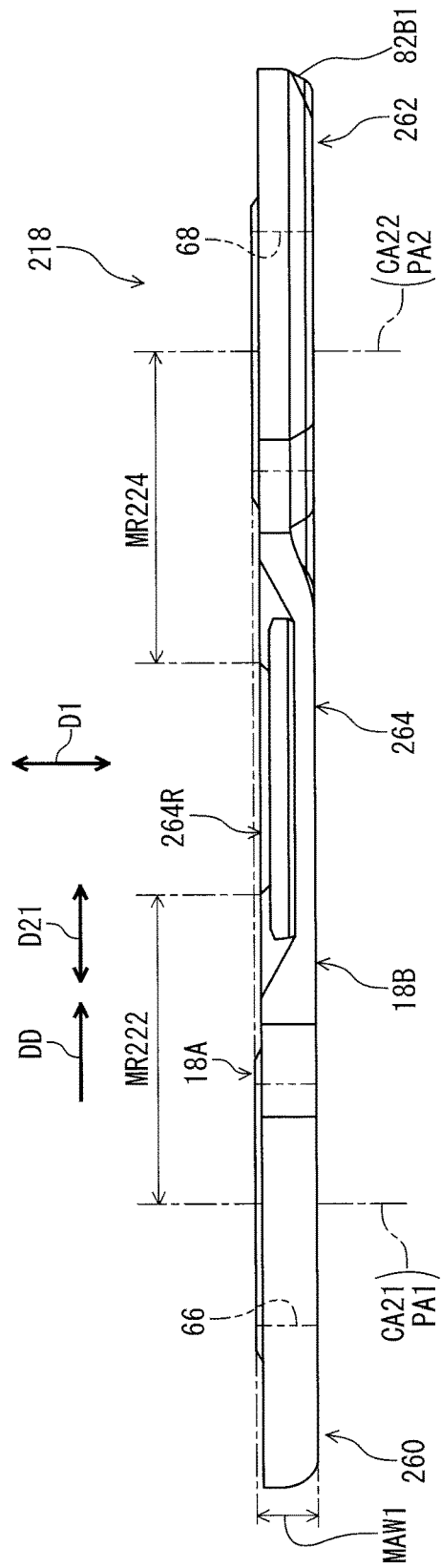
FIG. 42 is a top view of the first outer link plate of the bicycle chain illustrated in FIG. 31.

As seen in FIG. 42, a maximum axial width MAW1 of the first outer link plate 218 is equal to or smaller than 1 mm. The maximum axial width MAW1 of the first outer link plate 218 is equal to or larger than 0.7 mm. The maximum axial width MAW1 is defined in the axial direction D1. In this embodiment, the maximum axial width MAW1 is 0.81 mm. However, the maximum axial width MAW1 is not limited to this embodiment and the above ranges.

Figure 43:
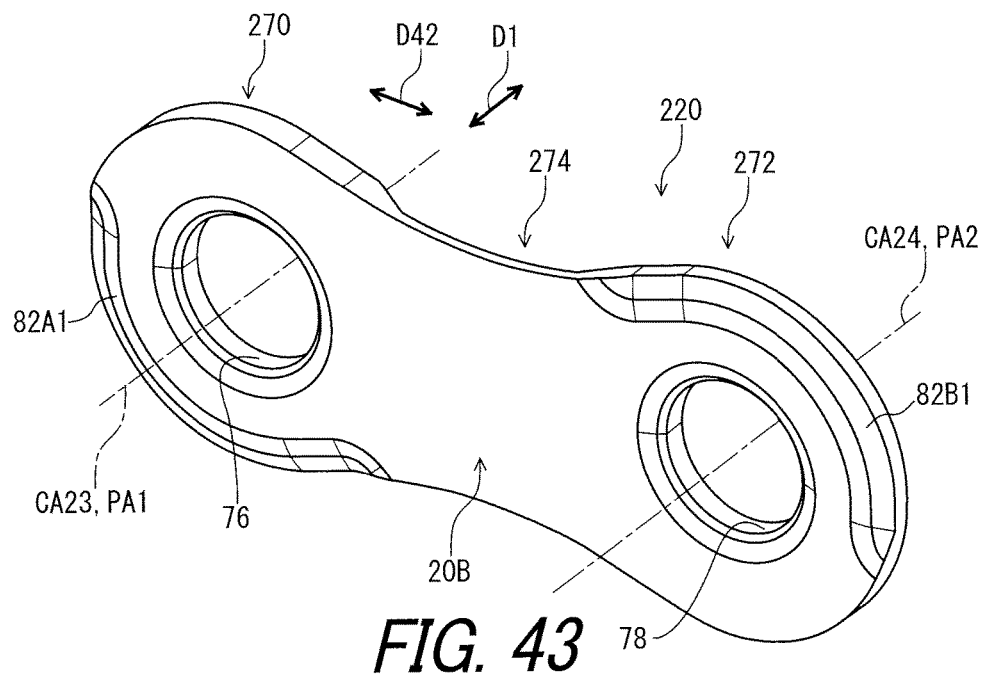
FIG. 43 is a perspective view of a second outer link plate of the bicycle chain illustrated in FIG. 31.
Figure 44:
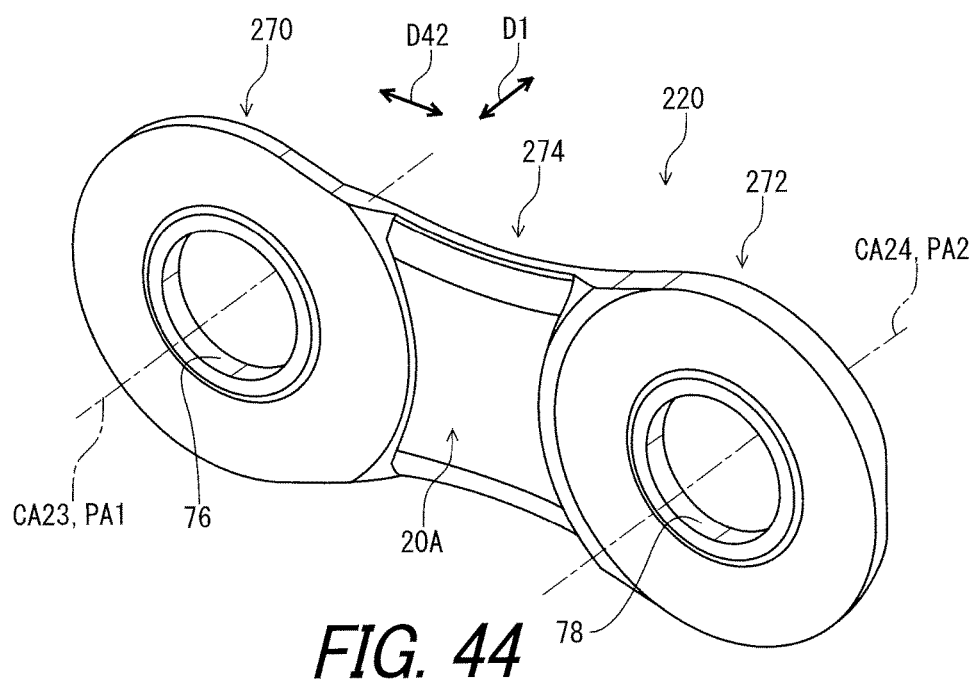
FIG. 44 is another perspective view of the second outer link plate of the bicycle chain illustrated in FIG. 31.

As seen in FIGS. 43 and 44, the second outer link plate 220 has substantially the same structure as that of the first outer link plate 218. The second outer link plate 220 comprises a third outer-link end portion 270, a fourth outer-link end portion 272, and a second outer-link intermediate portion 274. The third outer-link end portion 270 has substantially the same structure as that of the first outer-link end portion 260. The fourth outer-link end portion 272 has substantially the same structure as that of the second outer-link end portion 262. The second outer-link intermediate portion 274 has substantially the same structure as that of the first outer-link intermediate portion 264. Thus, it will not be described in detail here for the sake of brevity.

As seen in FIG. 31, the first chamfer 250A1 is inclined to make the first inner-link end portion 30 of the first inner link plate 214 suitable for an outline of the second tooth TH2 when the second tooth TH2 is engaged in the outer link space SP2. The second chamfer 250B1 is inclined to make the second inner-link end portion 32 of the first inner link plate 214 suitable for the outline of the second tooth TH2 when the second tooth TH2 is engaged in the outer link space SP2. The third chamfer 252A1 is inclined to make the third inner-link end portion 40 of the second inner link plate 216 suitable for the outline of the second tooth TH2 when the second tooth TH2 is engaged in the outer link space SP2. The fourth chamfer 252B1 is inclined to make the fourth inner-link end portion 42 of the second inner link plate 216 suitable for the outline of the second tooth TH2 when the second tooth TH2 is engaged in the outer link space SP2. The above features improve chain-holding performance between the bicycle sprocket B51 and the bicycle chain 212.

Third Embodiment

A bicycle chain 312 in accordance with a third embodiment will be described below referring to FIGS. 45 to 47. The bicycle chain 312 has the same structure as that of the bicycle chain 212 except for the first inner link plate 214. Thus, elements having substantially the same function as those in the above embodiments will be numbered the same here, and will not be described and/or illustrated again in detail here for the sake of brevity.

Figure 45:
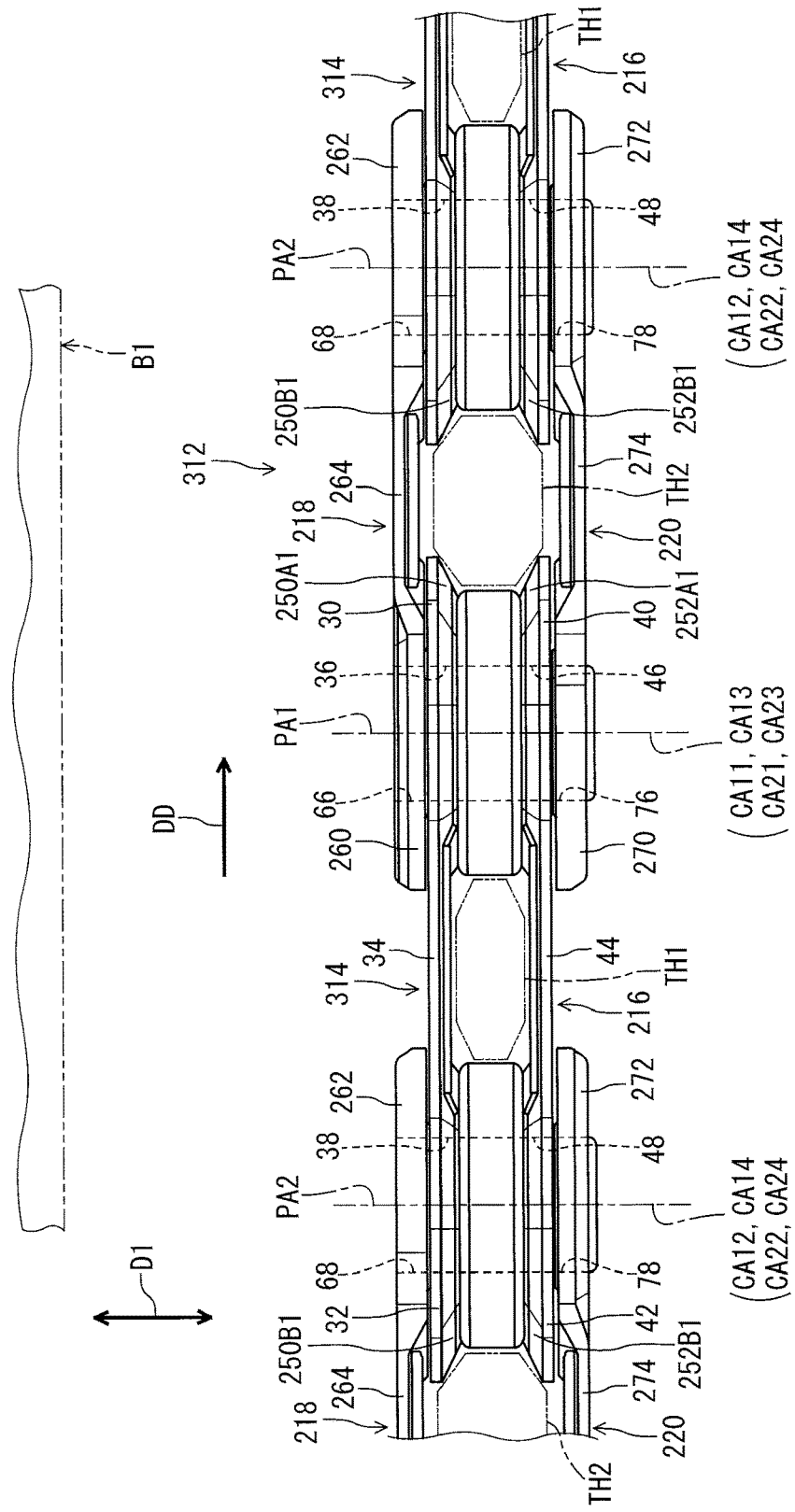
FIG. 45 is a partial plan view of a bicycle chain in accordance with a third embodiment.

As seen in FIG. 45, the bicycle chain 312 comprises a first inner link plate 314, the second inner link plate 216, the first outer link plate 218, and the second outer link plate 220. In this embodiment, the bicycle chain 312 comprises a plurality of first inner link plates 314. However, a total number of the first inner link plates 314 is not limited to this embodiment.

Figure 46:
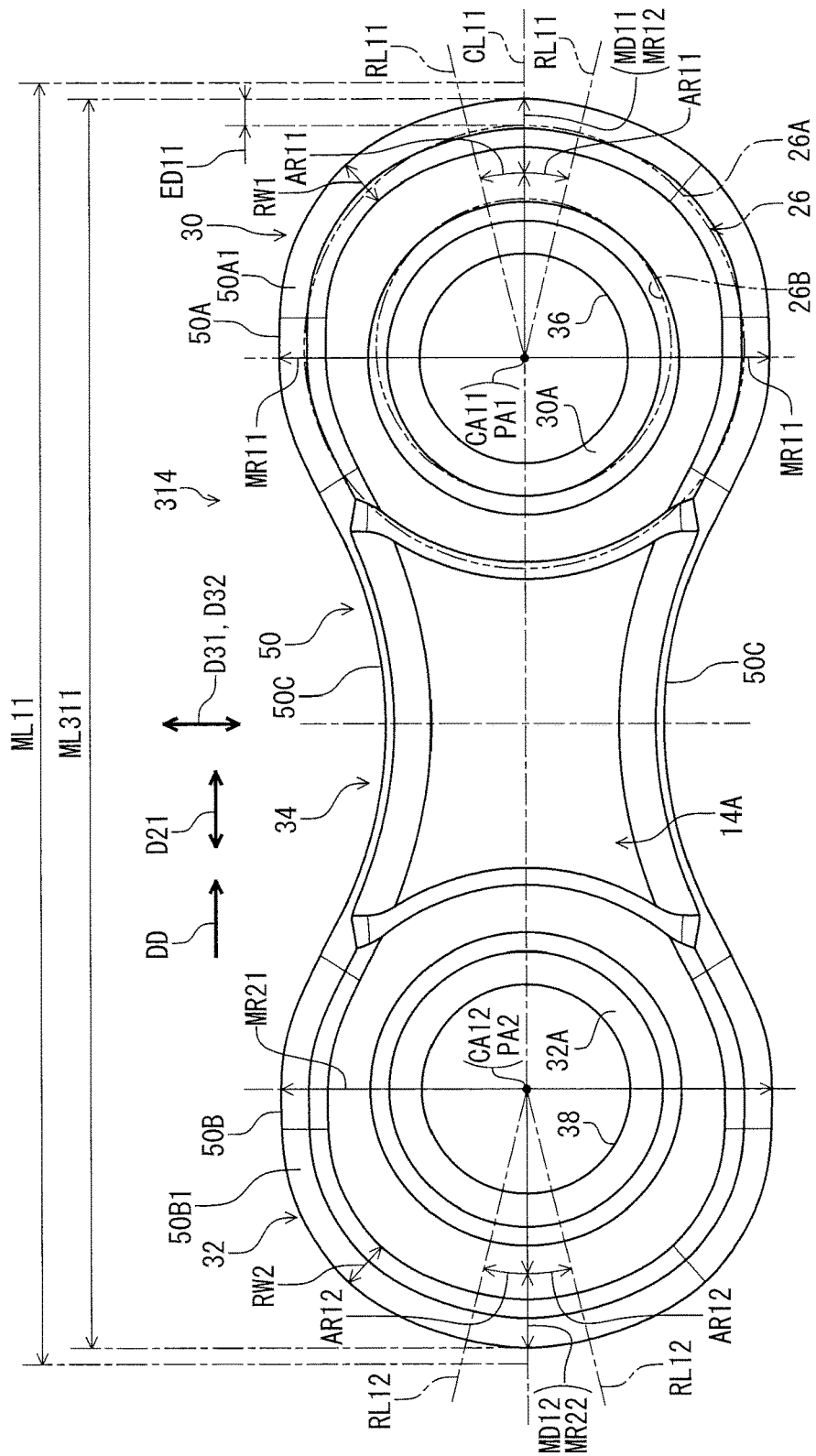
FIG. 46 is an enlarged side elevational view of a first inner link plate of the bicycle chain illustrated in FIG. 45.

As seen in FIG. 46, the first inner link plate 314 has substantially the same structure as that of the first inner link plate 214 of the second embodiment. The first inner-link end edge 50A has the first chamfer 50A1 extending about the first inner-link center axis CA11 such that a part of the first chamfer 50A1 is disposed in the first circumferential area AR11.

Figure 47:
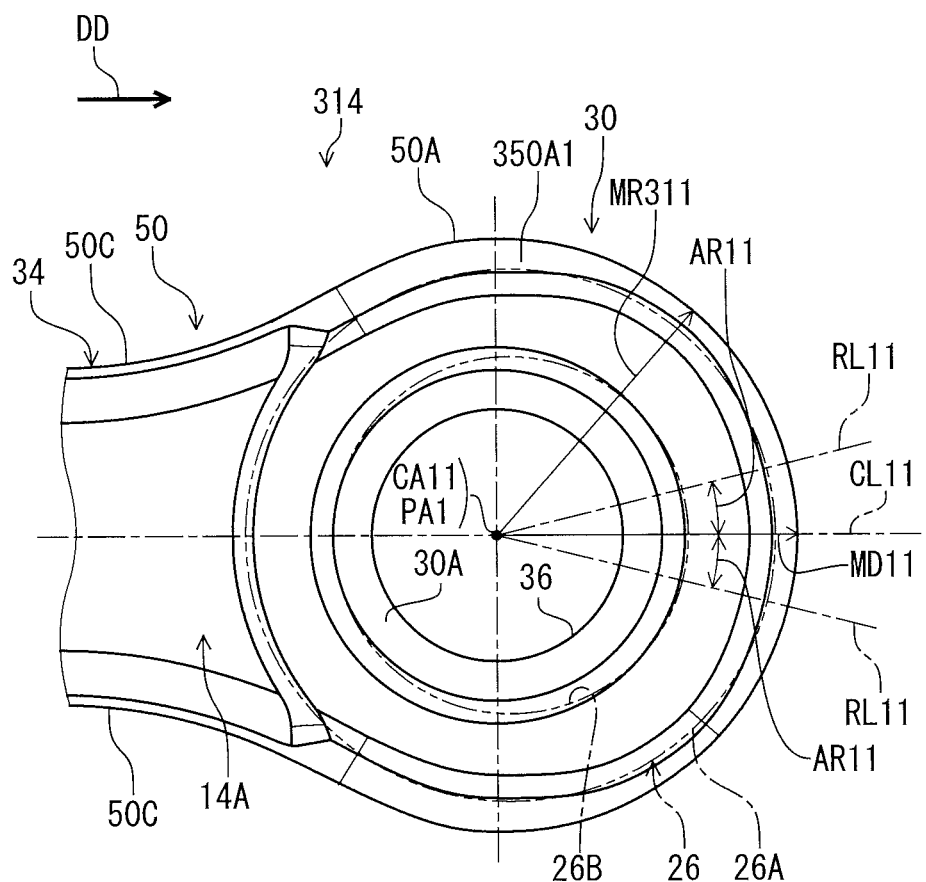
FIG. 47 is an enlarged side elevational view of a first inner link plate of a bicycle chain in accordance with a modification of the third embodiment.

As seen in FIG. 47, the first inner-link end portion 30 can partly have a circular shape. In such an embodiment, the first inner-link end portion 30 has a first radial distance MR311 defined from the first inner-link center axis CA11 to the first inner-link end edge 50A. The first radial distance MR311 is equal to or larger than 4.36 mm.

Fourth Embodiment

A bicycle chain 412 in accordance with a fourth embodiment will be described below referring to FIGS. 48 and 49. The bicycle chain 412 has the same structure as that of the bicycle chain 212 except for the second inner link plate 216. Thus, elements having substantially the same function as those in the above embodiments will be numbered the same here, and will not be described and/or illustrated again in detail here for the sake of brevity.

Figure 48:
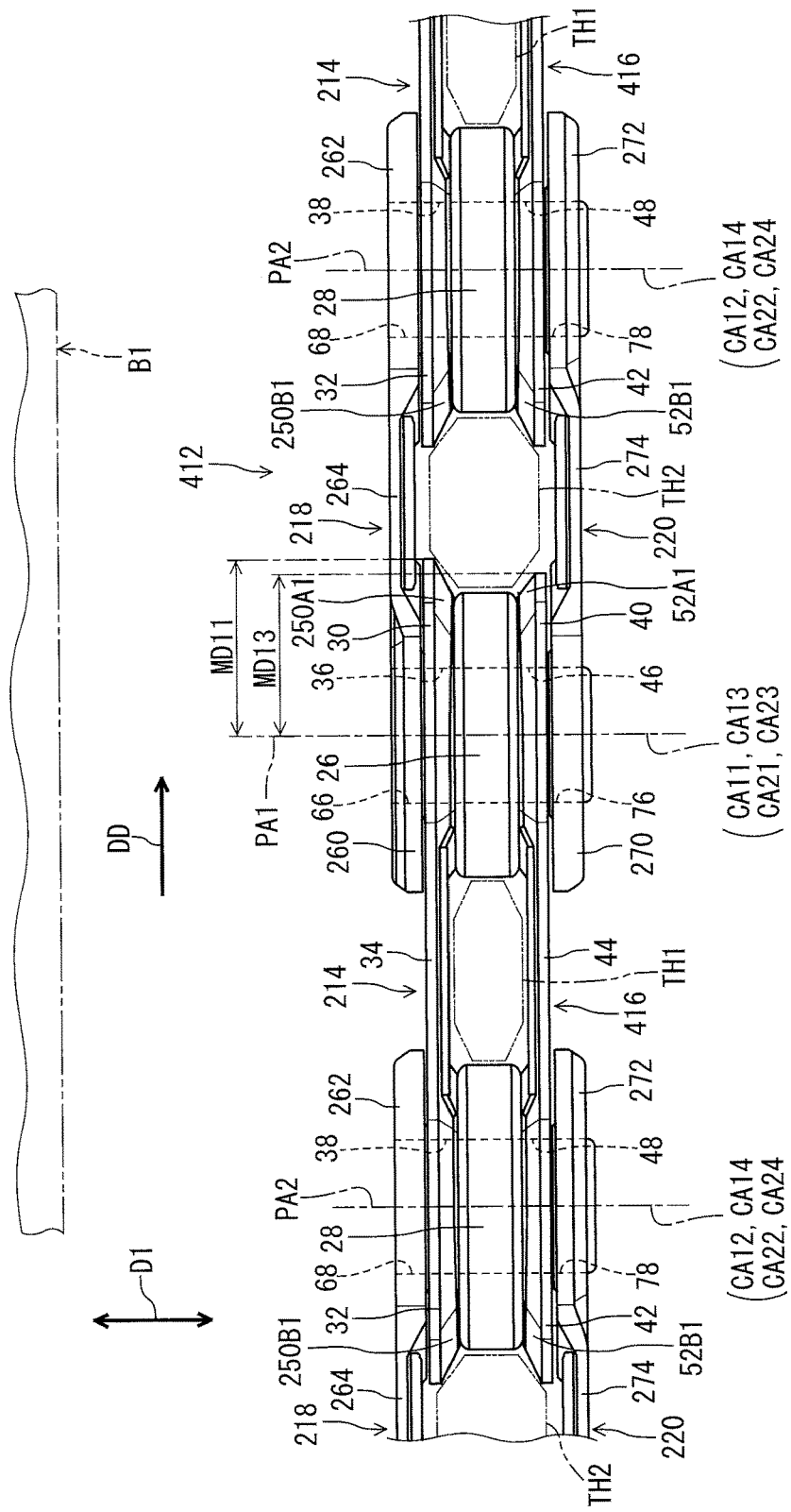
FIG. 48 is a partial plan view of a bicycle chain in accordance with a fourth embodiment.

As seen in FIG. 48, the bicycle chain 412 comprises the first inner link plate 214, a second inner link plate 416, the first outer link plate 218, and the second outer link plate 220. In this embodiment, the bicycle chain 412 comprises a plurality of second inner link plates 416. However, a total number of the second inner link plates 416 is not limited to this embodiment.

Figure 49:
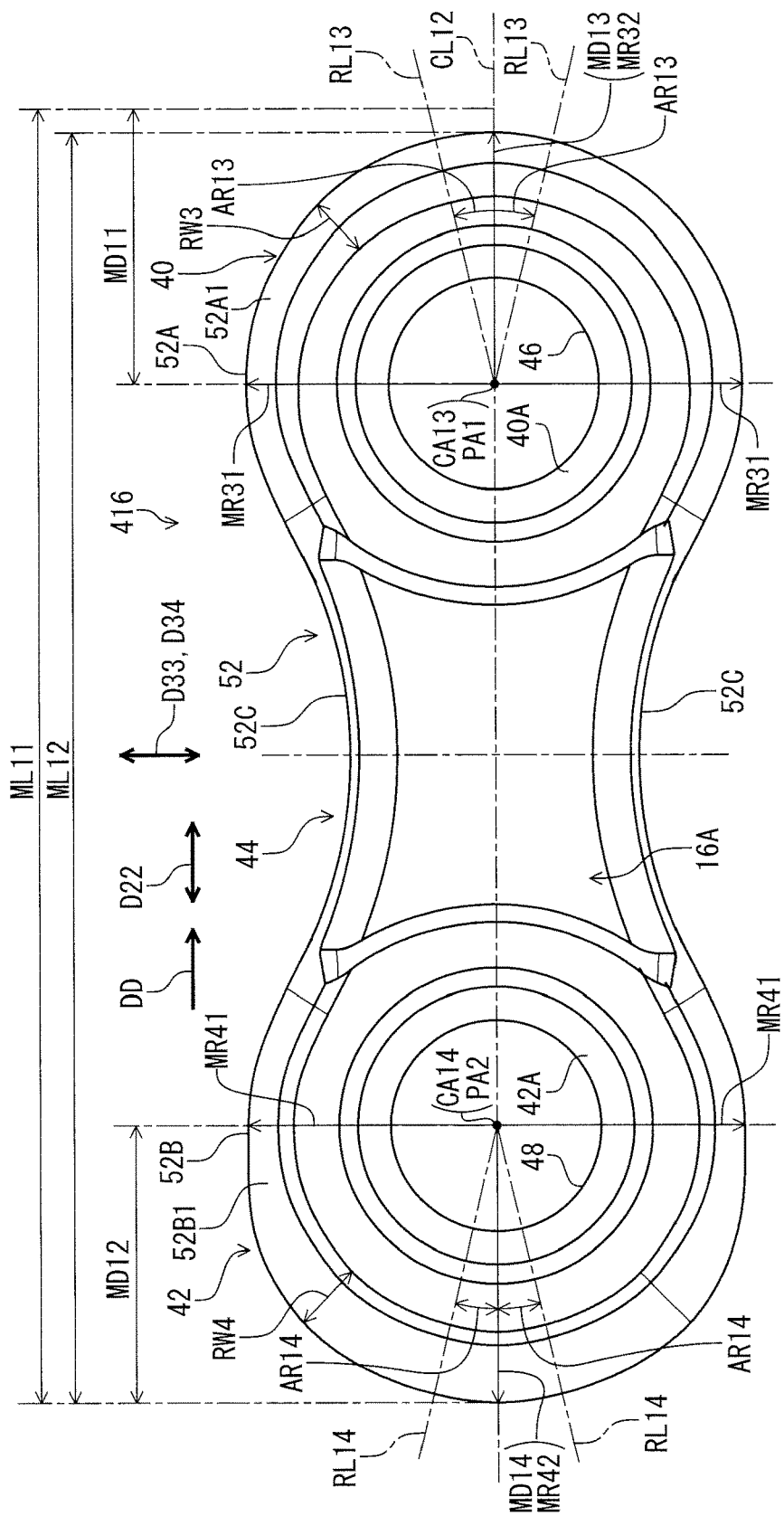
FIG. 49 is an enlarged side elevational view of a second inner link plate of the bicycle chain illustrated in FIG. 48.

As seen in FIG. 49, the first maximum distance MD11 is larger than the third maximum distance MD13. The third maximum distance MD13 is smaller than the fourth maximum distance MD14. The fourth maximum distance MD14 is substantially equal to the first maximum distance MD11 and the second maximum distance MD12. However, the first maximum distance MD11 can be substantially equal to or smaller than the third maximum distance MD13. The third maximum distance MD13 can be substantially equal to or larger than the fourth maximum distance MD14. The fourth maximum distance MD14 can be different from at least one of the first maximum distance MD11 and the second maximum distance MD12.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle chain comprising:
   a first outer link plate comprising:
      a first outer-link end portion including a first outer-link circular opening having a first outer-link center axis;
      a second outer-link end portion including a second outer-link circular opening having a second outer-link center axis parallel to the first outer-link center axis, the second outer-link center axis being spaced apart from the first outer-link center axis in a first outer-link longitudinal direction;
      a first outer-link intermediate portion interconnecting the first outer-link end portion and the second outer-link end portion, the first outer-link end portion, the second outer-link end portion and the first outer-link intermediate portion defining a first outer-link outer peripheral edge comprising:
         a first outer-link end edge extending about the first outer-link end portion;
         a second outer-link end edge extending about the second outer-link end portion; and
         a pair of first outer-link intermediate edges extending along the first outer-link intermediate portion between the first outer-link end edge and the second outer-link end edge; and
      a first outer-link longitudinal centerline perpendicular to the first outer-link center axis and the second outer-link center axis, a first radial distance being defined from the first outer-link center axis to the first outer-link end edge in a perpendicular direction perpendicular to the first outer-link longitudinal centerline when viewed in an axial direction parallel to the first outer-link center axis, a minimum distance being defined between the pair of first outer-link intermediate edges in the perpendicular direction, the minimum distance being smaller than 200% of the first radial distance, the minimum distance being equal to or larger than 5 mm.

2. The bicycle chain according to claim 1, wherein the minimum distance is equal to or smaller than 8 mm.

3. The bicycle chain according to claim 1, wherein the minimum distance is equal to or larger than 121% of the first radial distance.

4. The bicycle chain according to claim 3, wherein the minimum distance is equal to or smaller than 190% of the first radial distance.

5. The bicycle chain according to claim 1, wherein at least one of the pair of first outer-link intermediate edges has a curvature radius equal to or larger than 8.2 mm.

6. The bicycle chain according to claim 5, wherein the curvature radius is equal to or smaller than 12 mm.

7. The bicycle chain according to claim 5, wherein
the first outer-link end edge includes at least one first outer-link straight edge portion and at least one first outer-link curved edge portion,
the second outer-link end edge includes at least one second outer-link straight edge portion and at least one second outer-link curved edge portion, and
the at least one first outer-link straight edge portion and the at least one second outer-link straight edge portion are tangent to a virtual circle having a radius equal to the curvature radius of the at least one of the pair of first outer-link intermediate edges when viewed in the axial direction.

8. The bicycle chain according to claim 7, wherein
the first outer-link longitudinal centerline bisects the first outer-link plate into a first side and a second side opposite to the first side with respect to the first outer-link longitudinal centerline, and
the at least one first outer-link straight edge portion of the first side and the at least one second outer-link straight edge portion of the first side are tangent to the virtual circle having the radius equal to the curvature radius of the at least one of the pair of first outer-link intermediate edges of the first side when viewed in the axial direction.

9. The bicycle chain according to claim 1, wherein
at least one of the first outer-link end edge, the second outer-link end edge, and the pair of first outer-link intermediate edges has a chamfer.

10. The bicycle chain according to claim 1, wherein
a maximum axial width of the first outer link plate is equal to or smaller than 1 mm.

11. The bicycle chain according to claim 10, wherein
the maximum axial width of the first outer link plate is equal to or larger than 0.7 mm.

12. A bicycle chain comprising:
a first outer link plate comprising:
    a first outer-link end portion including a first outer-link opening having a first outer-link center axis;
    a second outer-link end portion including a second outer-link opening having a second outer-link center axis parallel to the first outer-link center axis, the second outer-link center axis being spaced apart from the first outer-link center axis in a first outer-link longitudinal direction;
    a first outer-link intermediate portion interconnecting the first outer-link end portion and the second outer-link end portion; and
    a first outer-link longitudinal centerline perpendicular to the first outer-link center axis and the second outer-link center axis, a first radial distance being defined from the first outer-link center axis to the first outer-link end edge in a perpendicular direction perpendicular to the first outer-link longitudinal centerline when viewed in an axial direction parallel to the first outer-link center axis, the first outer-link intermediate portion having a recess, a second radial distance being defined between the first outer-link center axis and a boundary of the recess when viewed in an axial direction parallel to the first outer-link center axis, the second radial distance being larger than the first radial distance.

13. The bicycle chain according to claim 12, wherein
the second radial distance is larger than 4.2 mm.

14. The bicycle chain according to claim 12, wherein
the second radial distance is equal to or smaller than 4.75 mm.

15. A bicycle chain comprising:
a first outer link plate comprising:
    a first outer-link end portion including a first outer-link opening having a first outer-link center axis;
    a second outer-link end portion including a second outer-link opening having a second outer-link center axis parallel to the first outer-link center axis, the second outer-link center axis being spaced apart from the first outer-link center axis in a first outer-link longitudinal direction; and
    a first outer-link intermediate portion interconnecting the first outer-link end portion and the second outer-link end portion, the first outer-link end portion, the second outer-link end portion and the first outer-link intermediate portion defining a first outer-link outer peripheral edge comprising:
        a first outer-link end edge extending about the first outer-link end portion;
        a second outer-link end edge extending about the second outer-link end portion;
        a pair of first outer-link intermediate edges extending along the first outer-link intermediate portion between the first outer-link end edge and the second outer-link end edge, and
the first outer-link end edge having a first chamfer extending about the first outer-link center axis such that a part of the first chamfer disposed in a circumferential area defined from a first outer-link longitudinal centerline perpendicular to the first outer-link center axis and the second outer-link center axis to a first reference line extending radially outwardly from the first outer-link center axis when viewed in an axial direction of the first outer-link center axis, the circumferential area being smaller than 90 degrees.

16. The bicycle chain according to claim 15, wherein
the circumferential area is equal to or smaller than 45 degrees.

17. The bicycle chain according to claim 15, wherein
the circumferential area is larger than 0 degrees.

* * * * *